(12) United States Patent
Amaravadi et al.

(10) Patent No.: US 10,767,426 B2
(45) Date of Patent: Sep. 8, 2020

(54) TRANSVERSE FLOW MICROFILTRATION OF SOLIDS FROM FLUIDS WITH INSERTS

(71) Applicant: M-I L.L.C., Houston, TX (US)

(72) Inventors: Venkata Kasi Amaravadi, Tomball, TX (US); Edward Kronenberger, Missouri City, TX (US)

(73) Assignee: M-I L.L.C., Houston, TX (US)

( * ) Notice: Subject to any disclaimer, the term of this patent is extended or adjusted under 35 U.S.C. 154(b) by 99 days.

(21) Appl. No.: 15/314,654

(22) PCT Filed: Jun. 1, 2015

(86) PCT No.: PCT/US2015/033538
§ 371 (c)(1),
(2) Date: Nov. 29, 2016

(87) PCT Pub. No.: WO2015/184444
PCT Pub. Date: Dec. 3, 2015

(65) Prior Publication Data
US 2017/0114599 A1    Apr. 27, 2017

Related U.S. Application Data

(60) Provisional application No. 62/005,750, filed on May 30, 2014.

(51) Int. Cl.
*E21B 21/06* (2006.01)
*B01D 65/02* (2006.01)
*B01D 61/00* (2006.01)
*E21B 43/34* (2006.01)
*B01D 21/26* (2006.01)

(52) U.S. Cl.
CPC .......... *E21B 21/065* (2013.01); *B01D 21/262* (2013.01); *B01D 61/00* (2013.01); *B01D 65/02* (2013.01); *E21B 43/34* (2013.01); *B01D 2311/2676* (2013.01); *B01D 2321/04* (2013.01)

(58) Field of Classification Search
CPC ............................ B01D 63/063; B01D 63/065
See application file for complete search history.

(56) References Cited

U.S. PATENT DOCUMENTS 3,450,207 A * 6/1969 Hirsch .................. E21B 43/086
166/233
3,612,282 A * 10/1971 Cheng .................... B01D 61/08
210/321.89
5,132,025 A    7/1992 Hays
5,177,014 A    1/1993 O'Connor et al.
(Continued)

OTHER PUBLICATIONS

International Search Report and Written Opinion regarding corresponding application No. PCT/US2015/033538; dated Sep. 4, 2015; 14 pages.
(Continued)

*Primary Examiner* — Ryan B Huang
(74) *Attorney, Agent, or Firm* — Jeffrey D. Frantz

(57) ABSTRACT

A system for processing fluids is disclosed including a pump in fluid communication with a used fluid pit, a membrane separator in fluid communication with the used fluid pit, wherein an insert is disposed within the membrane separator, and a clean fluid pit in fluid communication with the membrane separator.

9 Claims, 15 Drawing Sheets

(56) References Cited

U.S. PATENT DOCUMENTS

| | | | |
|---|---|---|---|
| 6,177,014 B1* | 1/2001 | Potter | B01D 61/14 210/651 |
| 2011/0220573 A1* | 9/2011 | Dixit | B01D 61/147 210/639 |
| 2013/0233786 A1 | 9/2013 | Posa | |

OTHER PUBLICATIONS

International Preliminary Report on Patentability for the equivalent International patent application PCT/US2015/033538 dated Dec. 15, 2016.

Office Action for the equivalent Canadian patent application 2950145 dated Oct. 3, 2017.

Office Action for the equivalent Azerbaijan patent application 2950145 dated Dec. 24, 2019.

Decision on Grant for the counterpart Azerbaijan patent application 2950145 dated Oct. 10, 2019 with full translation into English.

\* cited by examiner

TRANSVERSE FLOW MICROFILTRATION OF SOLIDS FROM FLUIDS WITH INSERTS

CROSS REFERENCE TO RELATED APPLICATIONS

This application is a National Stage application of International Application No. PCT/US2015/033538 filed Jun. 1, 2015, which claims the benefit of U.S. Provisional Application No. 62/005,750 filed on May 30, 2014, incorporated by reference herein in its entirety.

BACKGROUND

When drilling or completing wells in earth formations, various fluids are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, placing a packer, abandoning the well or preparing the well for abandonment, and otherwise treating the well or the formation.

Fluids or muds typically include a base fluid and weighting agents to help remove cuttings and other solids from the well. During drilling and wellbore treatments, the fluid is injected through the center of the drill string to the bit and exits through the annulus between the drill string and the wellbore. During this process, the fluid may cool and lubricate the bit and/or transport drill cuttings and other solids to the surface. At the surface, a portion of the drill cuttings can be separated from the fluid and the fluid can be circulated back into the well for reuse.

Drill cuttings can originate from different geological strata, including clay, rock, limestone, sand, shale, underground salt mines, brine, water tables, and other formations while other solids may include metal shards from tools and downhole equipment. These solids can range in size from less than two microns to several hundred microns. Drill cuttings are commonly classified according to size: smaller than 2 microns are classified as clay; from 2 to 74 microns, silt; 74 to 500 microns, sand; and larger than 500 microns, cuttings. Several types of separation devices have been developed to efficiently separate the varied sizes of the weighting materials, drill cuttings, and solids from the drilling fluid, including shakers (shale, rig, screen), screen separators, centrifuges, hydrocyclones, desilters, desanders, mud cleaners, mud conditioners, dryers, filtration units, settling beds, sand traps, and the like.

A typical process used for the separation of drill cuttings and other solids from the fluid may include multiple steps which separate solids from fluids according to the size of the solids. Fluid returned from a well and containing drill cuttings, additives, and other solids can be fed to a shale shaker. The shale shaker may separate the fluid into large particles, such as drill cuttings, and effluent. The fluid and remaining particles within the effluent can then be passed through a degasser, a desander to remove sand, a desilter to remove silt, and a centrifuge to remove smaller particles. The solids, including any weighting materials, are then discarded and the resulting clean fluid can be reused. In some cases, solids may pass through the degasser, desander, desilter, and centrifuge, thus ending up with the clean fluid.

In some separating systems, the clean fluid can retain a portion of solids which can be recycled downhole with the clean fluid. In some cases the solids can damage the formation and/or downhole equipment. Additionally, small solids can accumulate in the downhole fluid which may also be detrimental to the formation. Further, if the solids content increases, additional drilling or completions fluid (water, oil, etc.) may be added to dilute the fluid and to maintain the desired weight of the fluid. The dilution of the fluid containing solids is often costly and can alter the balance of chemical and fluid proportions.

Separating systems having separating devices such as, for example, shakers, screen separators, centrifuges, and hydrocyclones, may also be used to separate solids from drilling fluids that are commonly used to treat and maintain wellbores. Some separating systems may allow a portion of solid particles to pass through the separating devices along with the desired clean fluid, and the solids can also be recycled into the wellbore with the clean fluid. As described above, solid particles may damage formation and/or downhole equipment.

Accordingly, there exists a need for a system and method for effectively separating solids from fluids to obtain a fluid having low solids and/or low gravity solids content.

SUMMARY

In one aspect, the embodiments disclosed herein relate to a system for processing fluids. The system may include a pump in fluid communication with a used fluid pit, a membrane separator in fluid communication with the used fluid pit, wherein an insert is disposed within the membrane separator, and a clean fluid pit in fluid communication with the membrane separator.

In another aspect, the embodiments disclosed herein relate to methods for processing fluids. The methods may include transferring a fluid from a used fluid pit to a membrane separator comprising an insert disposed within, the insert affixed within the membrane separator via an insert holder on each end of the membrane separator. The methods may further include separating the fluid into a permeate and a concentrate and transferring the permeate to a clean fluid pit.

Other aspects and advantages of the present disclosure will be apparent from the following description and the appended claims.

DETAILED DESCRIPTION

In one aspect, embodiments disclosed herein relate to systems and methods for separating solids from fluids. More specifically, embodiments disclosed herein relate to systems and methods for separating solids from fluids using a membrane separator.

As described above, a conventional separating system for removing solids from liquids may include devices such as, for example, shakers, screen separators, centrifuges, and hydrocyclones. In the embodiments disclosed herein, at least one membrane separator is used in a separating system. Additionally, the separating system may include an insert disposed within the membrane separator. Further, one or more of the devices listed above. Furthermore, the separating system having a membrane separator may also include an optional recycle loop and/or means for injecting separated fluid into an active fluid system, which will be described in detail below.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups, but do not preclude the presence or addition of one or more other features, integers, steps, operations, elements, components, and/or groups thereof. The methods, processes, and operations described herein are not to be construed as necessarily requiring any steps or performance in the particular order discussed or illustrated, unless specifically identified as an order of performance. It is also to be understood that additional or alternative steps may be employed.

When an element is referred to as being "on," "engaged to," "connected to," or "coupled to" another element or layer, it may be directly on, engaged, connected or coupled to the other element or layer, or intervening elements or layers may be present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Figure 1A:
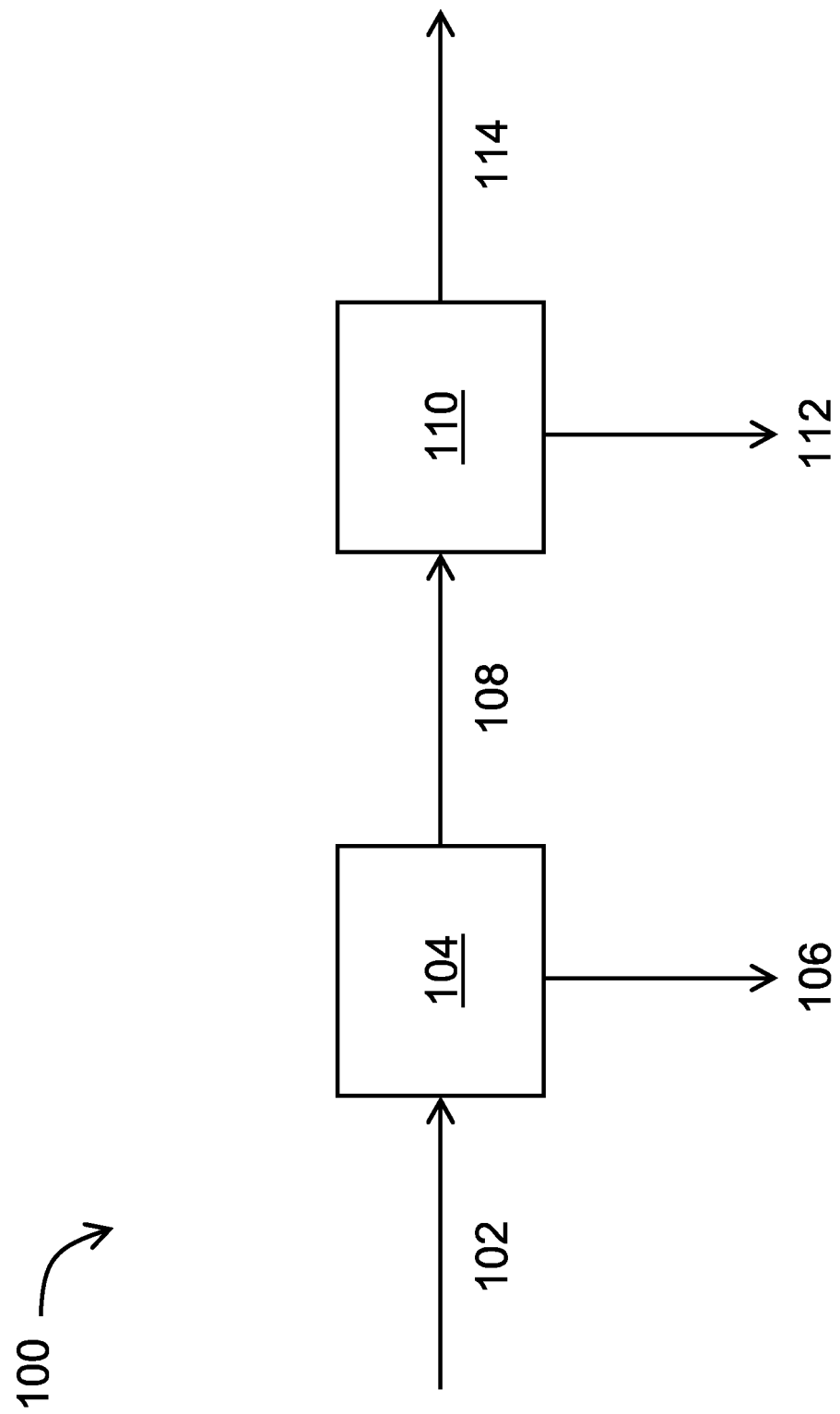
FIG. 1A is a schematic representation of a separating system in accordance with embodiments disclosed herein.

Referring to FIG. 1A, a schematic representation of a separating system is generally shown at 100. Solid-laden fluid may be introduced into separating system 100 where solid particles may be separated from the fluid. As referred to herein, a solid-laden fluid may contain solid particles in addition to a fluid. The fluid present in the solid-laden fluid may include a base fluid having an oil-base, a water-base, and/or a synthetic-base. The solid particles in the solid-laden fluid may be categorized as gravel, sand, silt, colloidal solids, or the like, according to size. Gravel may include solids greater than 2000 microns in size, sand may include solids ranging in size from approximately 74 to approximately 2000 microns, silt may include solids ranging in size from approximately 2 to approximately 74 microns, and colloidal solids may be less than approximately 2 microns in size. While larger solids such as, for example, intermediate solids (greater than approximately 250 microns), medium solids (between approximately 74 to 250 microns), fine solids (between approximately 44 to 74 microns), and ultra-fine solids (between approximately 2 to 44 microns), may be removed by shale shakers, hydrocyclones, settling pits, desanders, and centrifuges, smaller particles, such as colloidal solids, may form colloidal suspensions in the fluid and may continue to circulate through the system. As such, the concentration of colloidal solids may continue to build up in the fluid until the concentration has an adverse effect on fluid properties and stability.

In certain drilling fluids, weighting materials such as, for example, barite or bentonite may be used to adjust drilling fluid properties. While the weighting material may be introduced into the drilling fluid as a high gravity solid (HGS) having a specific gravity greater than approximately 4.2 and a size greater than approximately 2 microns, multiple circulations of the weighting material during drilling may pulverize the weighting material particles. Typical solids removal equipment may not be able to remove the colloidal particles, and colloidal material including pulverized weighting material may build up within the drilling fluid. Further, conventional solids control or removal equipment and methods may not be able to remove low gravity solids (LGS), such as fine drilled solids which may be smaller than 5 to 7 microns. Such low gravity solids may accumulate and degrade the performance of costly oil and synthetic based drilling fluids.

A number of variable parameters may effect the operation of separating system 100. Parameters such as, for example, viscosity, temperature, pressure, and volumetric flow rate may impact the flux, i.e., the amount of fluid that flows through a unit area per unit time, of separating system 100. In certain embodiments, the temperature of feed fluid 102 may be between approximately 70 and 200 degrees Fahrenheit. Additionally, the pressure of fluid within separating system 100 may be between approximately 10 and 150 psi. Further, the volumetric flow rate of fluid within separating system 200 may be between approximately 5 and 50 gpm. Adjustments to parameters such as, for example, viscosity, temperature, pressure, and volumetric flow rate may increase the flux of separating system 100.

As disclosed above, feed fluid 102 may include high gravity solids and/or low gravity solids (LGS). First separator 104, i.e. centrifuge, hydrocyclone, VERTI-G™, or the like, separates feed fluid 102 into a centrifuge underflow 106 and a centrifuge overflow 108. Centrifuge underflow 106 may contain a substantial portion of high gravity solids that may have been present in feed fluid 102. Centrifuge underflow 106 may be collected and removed from or recycled through separating system 100. Centrifuge overflow 108 may contain a relatively small amount of high gravity solids, but may still contain a substantial amount of low gravity solids that may have been present in feed fluid 102. Centrifuge overflow 108, which may still be defined as a solid-laden fluid due to the presence of low gravity solids and/or high gravity solids therein, then flows to membrane separator 110 for further separation.

Membrane separator 110 may separate centrifuge overflow 108 into a concentrate 114 and a permeate 112. Concentrate 114 may include a substantial amount of low gravity solids and/or high gravity solids that may have been present in centrifuge overflow 108. Permeate 112 includes the filtered fluid that passes through membrane separator 110. In certain embodiments, permeate 112 may contain a total solids content of approximately 0.5% by volume.

Figure 2:
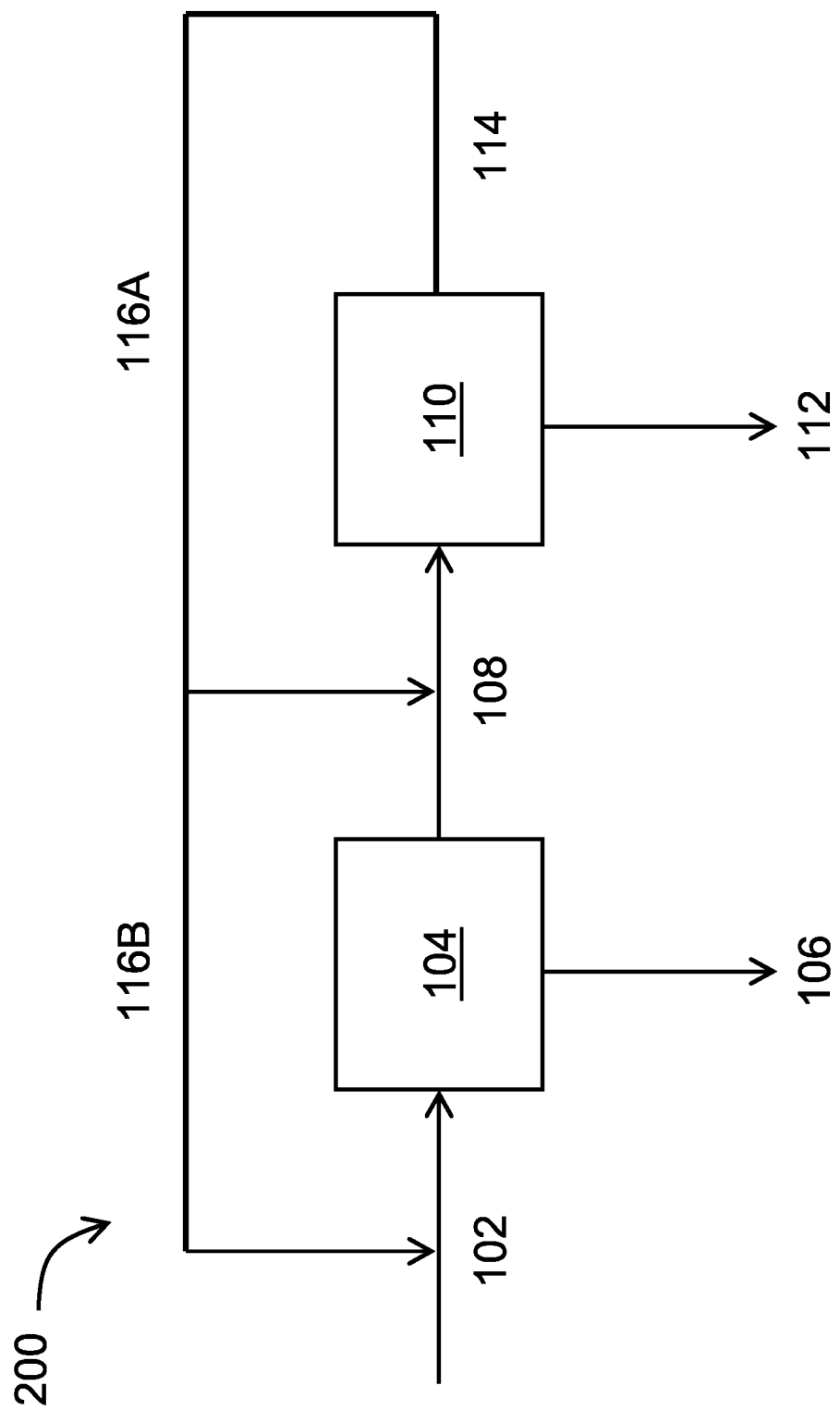
FIG. 2 is a schematic representation of a separating system in accordance with embodiments disclosed herein.

Referring to FIG. 2, a separating system 200 is shown having each element as described above with respect to FIG. 1A. Separating system 200 may further include an optional recycle loop 116A through which concentrate 114 may flow, such that concentrate 114 is introduced to separating system 200 after first separator 104 and before membrane separator 110. Separating system 200 may include recycle loop 116B which introduces concentrate 114 into separating system 200 before first separator 104. In certain embodiments, either or both recycle loops 116A and 116B may be used. In such embodiments, concentrate 114 may pass through membrane separator 110 multiple times. Each cycle of recycled fluid through membrane separator 110 may result in concentrate 114 having a greater solids content. An increase in concentrate 114 solids content may also increase the viscosity of concentrate 114. With an increase in viscosity, additional energy may be required to pump concentrate 114 through membrane separator 110 and recycle loop 116. Accordingly, in certain embodiments, concentrate 114 may pass through recycle loop 116 a number of times before reaching a given viscosity and, once reached, concentrate 114 may be removed from separating system 200. The given viscosity may be chosen based on pumping capacity, system efficiency, or other parameters. Rather than removing the fluid at a given viscosity, the temperature of the fluid may be increased and/or viscosity reducers may be added such that the viscosity of the fluid flowing through separating system 200 may be decreased.

In another embodiment, a heat exchanger (not shown) may be included in separating system 200 to increase the temperature of concentrate 114, thereby decreasing the viscosity of concentrate 114. Decreasing the viscosity of concentrate 114 may allow easier pumping of concentrate 114 through membrane separator 110 without increasing pumping pressure. Accordingly, in select embodiments, a concentrate in a separating system with a heat exchanger may make a greater number of passes through membrane separator 110 before reaching a given viscosity than a concentrate 114 in a separating system without a heat exchanger. Additionally, economic benefits may be achieved due to increased pumping efficiency.

Those of ordinary skill in the art will appreciate that depending on the properties of a particular fluid being processed, the temperature of the fluid may be increased prior to processing and may be adjusted during processing. By increasing the temperature of the fluids, the viscosity may be lowered, thereby enhancing filtration efficiency. The optimal temperature depends on the specific type of fluid being processed. For example, for fluids with low flash points, a relatively lower temperature, such as in a range between about 100° F. and about 120° F. may be optimal. For other types of fluids, relatively higher temperatures may be optimal, such as between about 70° F. and about 200° F. In still other embodiments, optimum temperatures may be in various other ranges, such as between 100° F. and 150° F., between 150° F. and 200° F., and between 160° F. and 180° F. Those of ordinary skill in the art will appreciate it may be beneficial to start the process and/or maintain the fluid temperature at relatively higher levels throughout the process.

Figure 3:
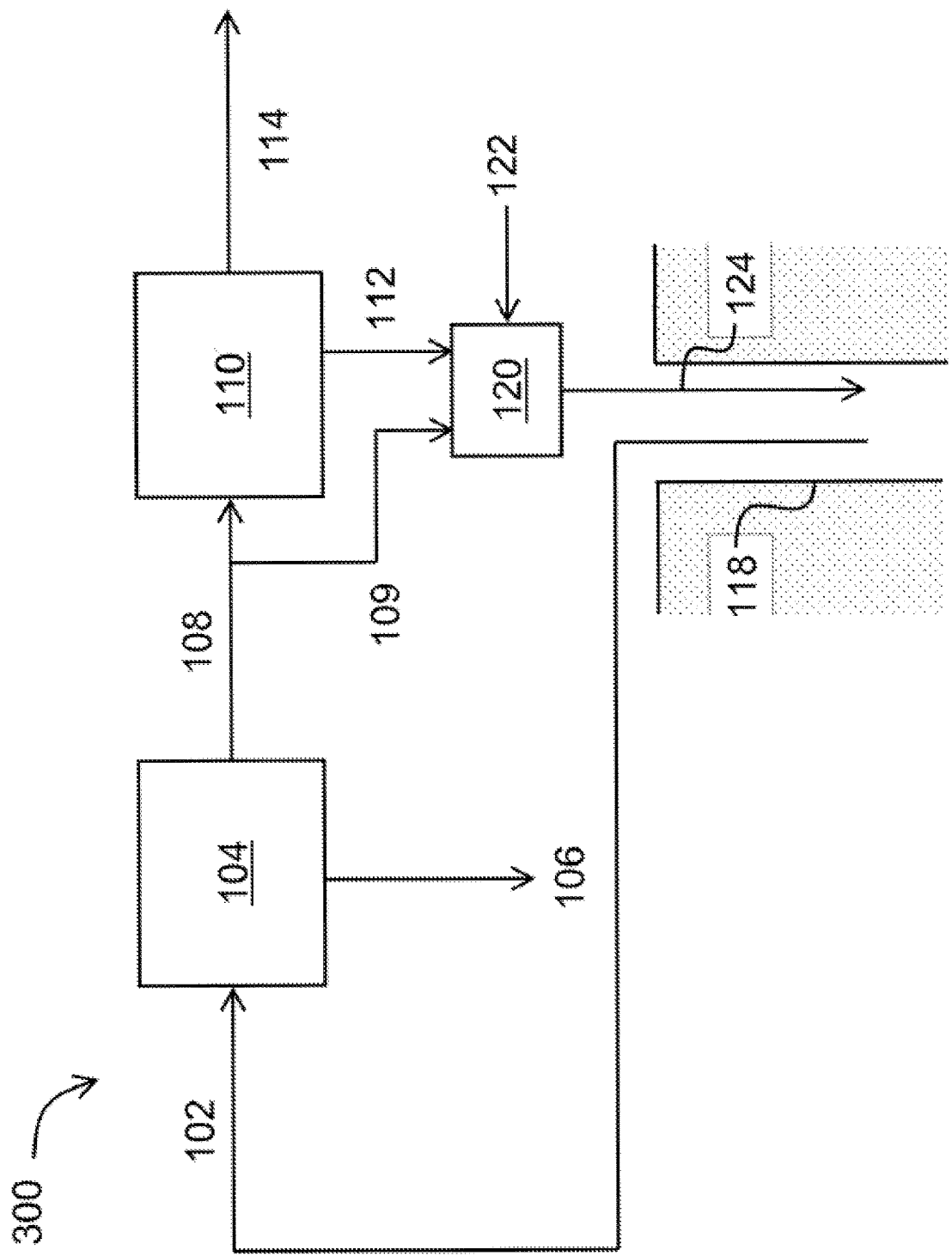
FIG. 3 is a schematic representation of a separating system in accordance with embodiments disclosed herein.

Referring to FIG. 3, a separating system 300 is shown having each element as described above with respect to FIG. 1A. Separating system 300 further shows a slip stream 109, a wellbore 118, and an active mud system 120 that may be fluidly connected with a drill string and a drill bit of a drilling system, as previously described. Feed fluid 102 may be a solid-laden fluid including water-based, oil-based, and/or synthetic-based fluids that may be obtained from wellbore 118.

In certain embodiments, separating system 300 may operate continuously. For example, a solid-laden fluid may be obtained from wellbore 118. The solid-laden fluid, i.e., feed fluid 102, may be fed into separating system 300 wherein solids and fluids contained in the solid-laden fluid are separated using centrifuge 104. Centrifuge overflow 108 may then flow through slip stream 109 to active mud system 120 or may pass through membrane separator 110 in accordance with embodiments disclosed above. To that end, effluent from the centrifuge may have high gravity solids (e.g., barite, etc.) removed. Permeate 112 may be obtained from membrane separator 110 and may be injected into active mud system 120. In certain embodiments, additives 122 may also be added to active mud system 120. Additives 122 may include new drilling fluids, thinners, weighting agents, loss control materials, and/or conditioners that may alter the composition or characteristics of drilling fluids. The reconstituted drilling fluid may then be injected into wellbore 118 as shown by arrow 124.

Figure 4:
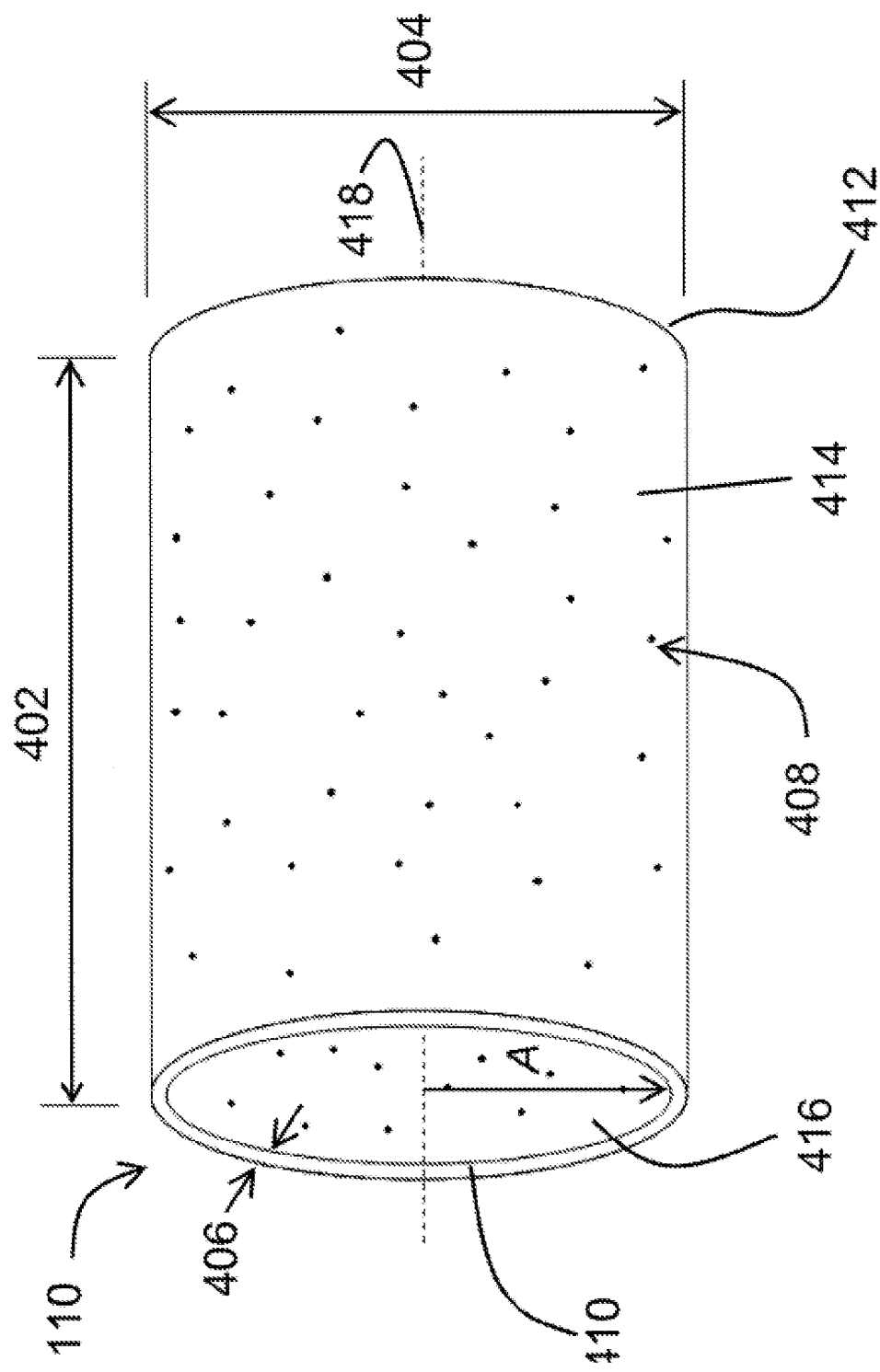
FIG. 4 is a perspective view of a membrane separator in accordance with embodiments disclosed herein.

Referring to FIG. 4, an example of a membrane separator 110 in accordance with embodiments disclosed herein is shown. In this embodiment, membrane separator 110 is tube shaped and may be made of stainless steel. In certain embodiments, membrane separator 110 may be made of type 316L stainless steel sintered with titanium dioxide ($TiO_2$). Membrane separator 110 may also be formed from Hastelloy® C, high nickel alloy, or ceramic membranes. For example, ceramic membranes, commercially available from CoMeTas of Copenhagen, Denmark, made partially or entirely from silicium carbide (SiC) may be used.

One of ordinary skill in the art will appreciate that dimensions of membrane separator 110, such as, for example, length 402, diameter 404, and thickness 406, may affect the amount of permeate 112 collected per unit volume of centrifuge overflow passed through membrane separator 110. Additionally, dimensions such as length 402, diameter 404, and thickness 406 may be adjusted based on the composition of the solid-laden fluid being passed through membrane separator 110 and/or the desired amount or composition of permeate 112. In certain embodiments, membrane separator 110 may have an inside diameter in a range of approximately 0.25 and 1 inches, and a thickness in a range of approximately 50 and 100 micron. In certain embodiments, the membrane separator may include multiple channels. In membranes having multiple channels, the membranes may be formed from multiple zirconia layers deposited on alumina supports, for example. In certain multiple channel membranes, the geometry of the specific channels may also vary. For example, the channels may be substantially round, oblong, square, diamond, or other geometry in cross-section. Those of ordinary skill in the art will appreciate that it may be beneficial to provide substantially smooth membrane channels, such as round or oblong channels, to mitigate the formation of surface cake on the membrane surface.

Pores 408 may be disposed in membrane separator 110 such that fluid may move from the inside to the outside of membrane separator 110. Pores 408 may have a specific pore size, thereby controlling the type and amount of fluid that may flow from inside membrane separator 110 to the outside. Pore size may also be chosen to prevent substantially small solid particles from entering and clogging pores 408. In certain embodiments, the pore size of pores 408 may be between 0.02 and 0.5 micron in diameter for TiO2 sintered 316L stainless steel or 0.02 to 2 micron in diameter for ceramics. Pore size may be chosen based on the concentrations and sizes of particles present within the fluid. For example, a pore size may be selected to be slightly smaller than the smallest particles present in the fluid so that particles from the fluid do not become lodged in pores 408, thereby plugging membrane separator 110. Additionally, a larger pore size may allow an increased amount of oil to pass through pores 408 and may increase the amount of oil flux through membrane separator 110.

Membrane separator 110 may further include a first opening 410 and a second opening 412 through which fluid may flow. In certain embodiments, membrane separator 110 may have an inner surface 416 and an outer surface 414 disposed between first and second openings 410, 412, such that cross-flow filtration through pores 408 may occur. One of ordinary skill in the art will appreciate that cross-flow filtration occurs when a solid-laden fluid flows in a first direction parallel to a filter and when a portion of the solid-laden fluid passes through the filter in a second direction that is approximately perpendicular to the first direction.

Referring to FIGS. 1A and 4 together, a flow pattern for a solid-laden fluid passing through membrane separator 110 is described. A solid-laden fluid, specifically, centrifuge overflow fluid 108, may flow into membrane separator 110 through first opening 410. Centrifuge overflow fluid 108 may contact inner surface 416 as it passes through membrane separator 110 toward second opening 412 in a first direction parallel to a central axis 418 of membrane separator 110. A portion of centrifuge overflow fluid 108 may pass through pores 408 to outer surface 414 in a direction approximately perpendicular to the first direction of flow of centrifuge overflow fluid 108, as indicated by arrow A. The fluid passing from inner surface 416 through pores 418 to outer surface 414 is defined herein as permeate 112.

Those of ordinary skill in the art will appreciate that more than one membrane separator 110, disposed in series or in parallel, may be used in a single separating system. Additionally, membrane separator 110 may have various membrane separator lengths, membrane separator diameters, and/or membrane separator thicknesses. Further, membrane separator 110 may include pores of various pore sizes.

Figure 7:
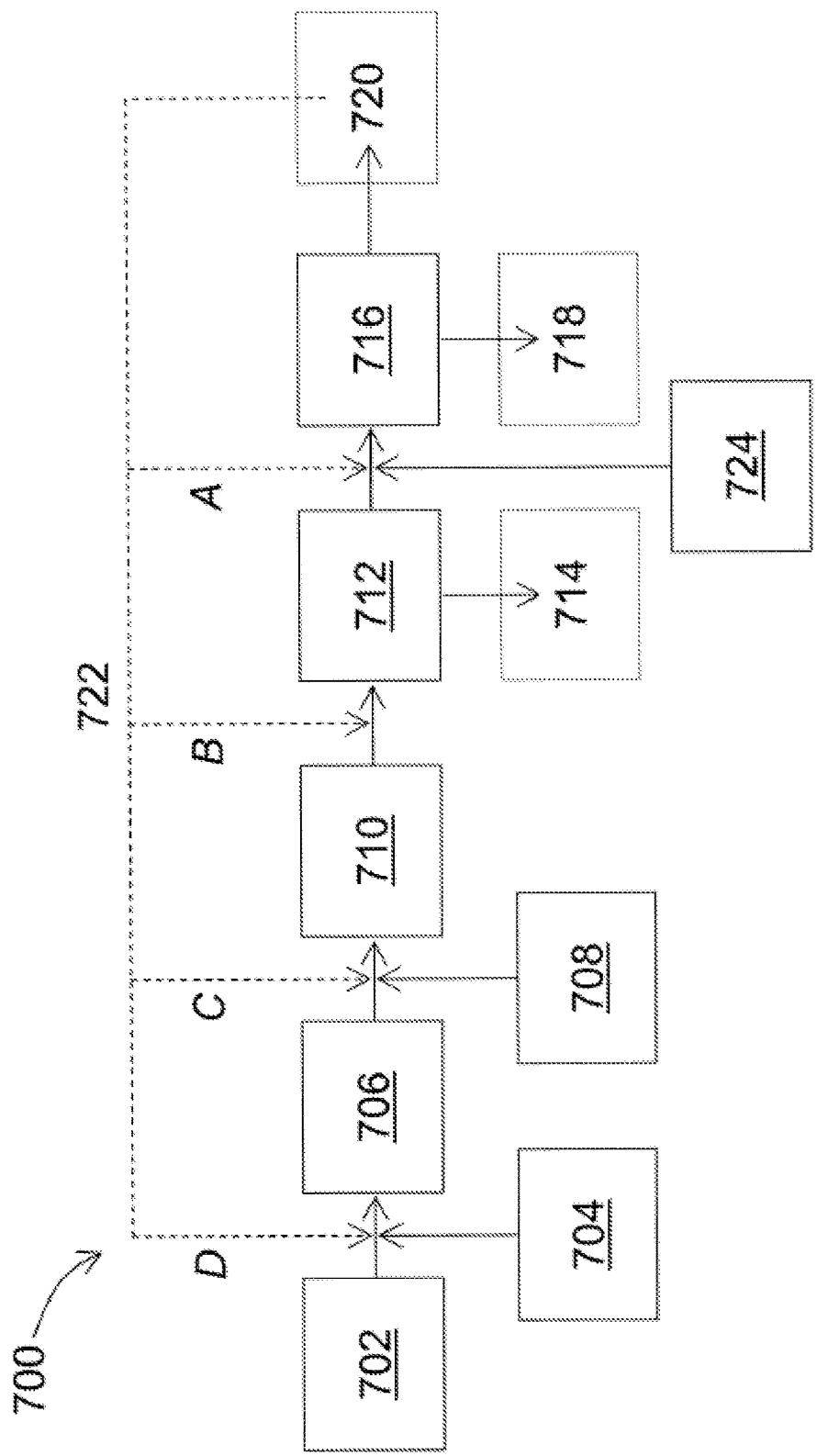
FIG. 7 is a schematic view of a separating system in accordance with embodiments disclosed herein.

Referring now to FIG. 7, an example of a separating system using chemical additives is shown. Separating system 700 includes mud, i.e., a solid-laden fluid, from a mud source 702. Mud source 702 may be, for example, a mud storage container or an active mud system. Chemical additives from a first chemical source 704 may be added to the mud, creating a first mixture. In certain embodiments, the chemicals additives may include anionic surfactants, non-ionic surfactants, alkyl polyglycosides, and combinations thereof. Other chemical additives that may also be used include, for example, EMR-953 and EMR-961 available from M-I Swaco L.L.C., Houston, Tex. The first mixture may then be passed through a pump 706, as shown. Additional chemical additives from a second chemical source 708 may then be added to the first mixture to create a second mixture. The second mixture may then be passed through a mixing system 710 which may include, for example, an agitator or an eductor. The second mixture may pass from mixing system 710 to a centrifuge 712 where a portion of solids may be removed from the second mixture and may be collected or discarded at 714. Additives 724 may be added to the remaining portion of the second mixture. In certain embodiments, additives 724 may include viscosity reducers and/or demulsifiers. A remaining portion of the second mixture may pass through a membrane separator 716 in accordance with embodiments disclosed herein. A permeate fluid 718, having a low solids content, may be collected for recycling into the active mud system. A concentrate fluid 720, having a relatively high solids content, may be collected for recycling, e.g., disposal, reprocessing, etc. In certain embodiments, concentrate fluid 720 may pass through an optional recycle loop 722, wherein concentrate fluid 720 is re-injected into separating system 700. One of ordinary skill in the art will appreciate that concentrate fluid 720 may be injected at any step in separating system 700. For example, concentrate fluid 720 may be introduced into separating system 700 at concentrate injection points A, B, C, or D. In select embodiments, permeate fluid 718 may be directly injected into an active mud system, or may be mixed with new mud or additives before being injected into an active mud system. In other embodiments, permeate fluid 718 may be collected for later use.

Those of ordinary skill in the art will appreciate that first chemical source 704 and second chemical source 708 may include, for example, surfactants or flocculants. Accordingly, a surfactant may be injected into separating system 700 before a flocculant, or a flocculant may be injected before a surfactant. In certain embodiments, chemical additives contained in first and second chemical sources 704, 708 may include, for example, chemicals from the polyhydroxyl fatty acid family. For example, Surethin®, Novathin™, Rheduce®, and Versathin®, available from M-I L.L.C., Houston, T.X. may be added prior to feeding the material to membrane separator 716. Additionally, acid such as hydrochloric acid (HCl), may also be added. Further, one of ordinary skill in the art will appreciate that at least one centrifuge may be used in separating system 700, and that more than one membrane separator may also be used.

After a separating system in accordance with embodiments disclosed herein is used, it may be cleaned using a variety of cleaning fluids such as, for example, recovered oil, soap solution, nitric acid, a solvent, surfactants, or base oil.

In addition to processing used drilling fluids, embodiments of the present disclosure may be used to process other types of fluids, such as completion fluids, workover fluids, production waste fluids, and other fluids using during the drilling, completion, and production process. During typical completion and workover fluid remediation, diatomaceous earth filter units are used with downstream guard cartridges to remove suspended solids so that formation pores and not plugged during production. At least 90 percent of the suspended particles in brines typically have diameters less than 20 microns. During diatomaceous earth filtration, the average filtration rate may be between 8-10 barrels per minute, and the average particle size removed by such filtration may be equal to or greater than 2 microns.

Embodiments of the present disclosure may provide for a more effective method of processing completion and other types of fluids, thereby improving the quality of the recovered fluids, as well as decreasing solids content that may otherwise be recirculated into a wellbore.

In addition to completion fluids, embodiments of the present application may be used to process other fluids/slurries, such as production waste/oil-based sludges produced during hydrocarbon production. Oil-based sludges may include complex water-in-oil emulsions that are stabilized by organic compounds and fine solids. Embodiments of the present disclosure may be used to recover oil from the emulsions after separating out solids. By separating out the water and fine solids, oil may be recovered for use during other aspects of the drilling operation, resale, and/or disposal.

EXAMPLES

Several tests were conducted to obtain data regarding the separation capabilities of a system having two centrifuges and the separation capabilities of a system having one centrifuge and one membrane separator. The tests and results are described below:

Example 1: Multiple Centrifuge System

Figure 5A:
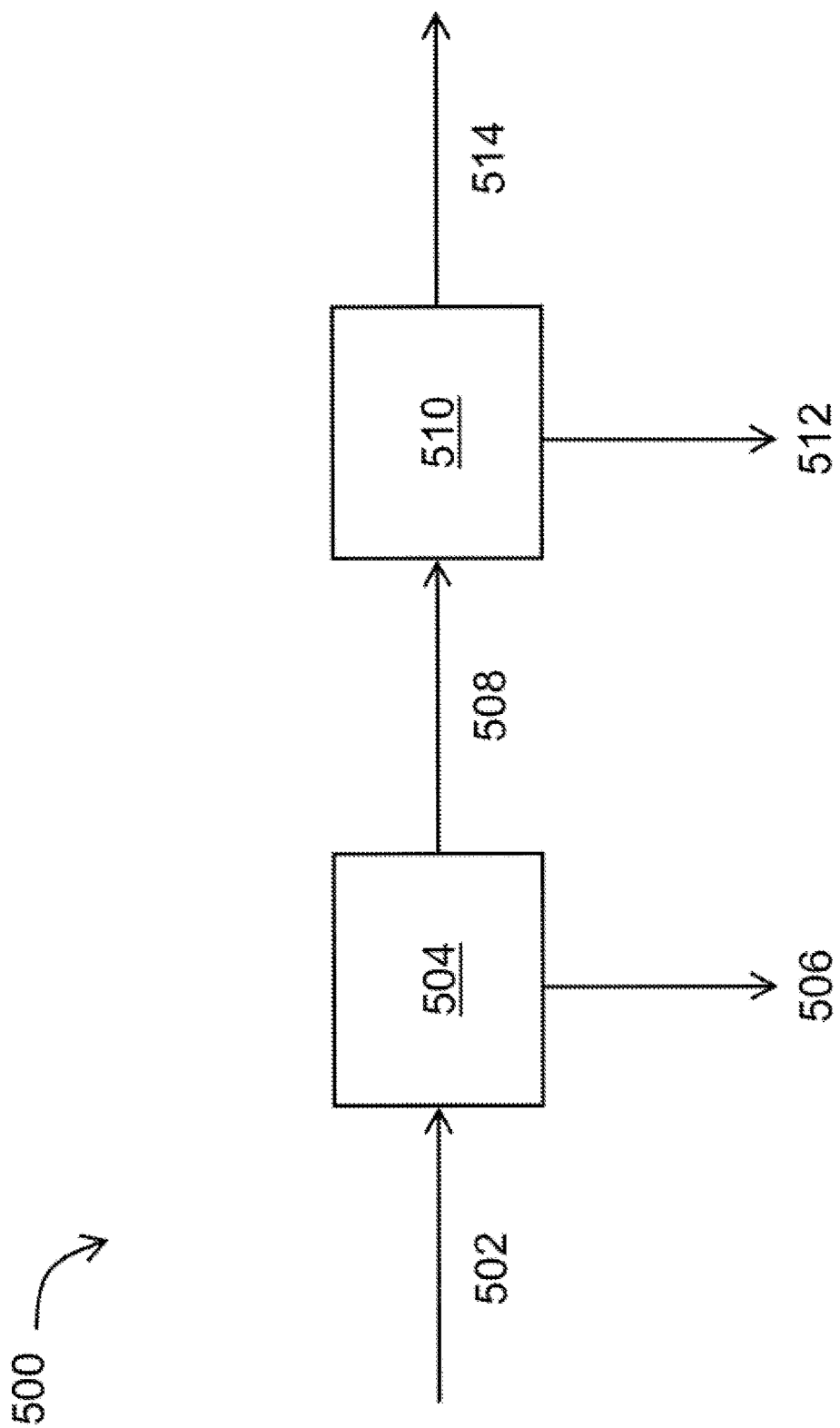
FIG. 5A is a schematic view of a separating system in accordance with embodiments disclosed herein.

The test described in this example was conducted to obtain data regarding the separation capabilities of a system having two centrifuges. Referring to FIG. 5A, a feed fluid 502 was introduced into a first centrifuge 504. In an embodiment, the first centrifuge had a 14" diameter, a 34" stainless steel bowl and conveyor assembly, and a 25 hp motor. After separation in first centrifuge 504, a first centrifuge underflow 506 was removed from separating system 500. A first centrifuge overflow 508 was then transferred from first centrifuge 504 to a second centrifuge 510. In an embodiment, second centrifuge 510 was 14" in diameter, having a 57.5" stainless steel bowl and conveyor assembly, and a 25 hp motor. After separation in second centrifuge 510, a second centrifuge underflow 512 was removed from system 500. Finally, a second centrifuge overflow 514 was obtained from second centrifuge 510. The properties and compositions of feed fluid 502, first centrifuge underflow 506, first centrifuge overflow 508, second centrifuge underflow 512, and second centrifuge overflow 514, after one cycle through separating system 500 are illustrated in Table 1, below:

TABLE 1

Results of Filtration of Oil-Based Muds using Centrifuges

| | Feed Fluid | First Centrifuge Overflow | Second Centrifuge Underflow | Second Centrifuge Overflow |
|---|---|---|---|---|
| Specific Gravity | 1.65 | 1.25 | — | 1.06 |
| Oil Content (% by vol) | 53.5 | 59 | 11.3 | 64 |
| Water Content (% by vol) | 21.5 | 26 | 6 | 26 |
| Solids Content (% by vol) | 25 | 15 | 82.7 | 10 |
| High Gravity Solids Content (% by vol) | 17.98 | 9 | — | 4.09 |
| Low Gravity Solids Content (% by vol) | 6.07 | 5 | — | 4.24 |

Table 1 shows that as feed fluid 502 passed through separating system 500, solids were removed from liquid. In this particular test, feed fluid 502 had a solids content of 25%, an oil content of 53.5%, a water content of 21.5%, and a specific gravity of 1.65. Specifically, high gravity solids made up 17.98% and low gravity solids made up 6.07% of feed fluid 502. After passing through first centrifuge 504, the solids content of first centrifuge overflow 508 was approximately 15%, high gravity solids accounting for 9% and low gravity solids accounting for 5%, oil content was 59%, and water content was 26%. Accordingly, the specific gravity of first centrifuge overflow 508 decreased to 1.25.

Second centrifuge underflow 512 exited second centrifuge 510 having a solids content of 82%, an oil content of 11.3%, and a water content of 6%. Second centrifuge overflow 514 exited second centrifuge 510 having a solids content of 10%, with high gravity solids accounting for 4.09% and low gravity solids accounting for 4.24%. Additionally, second centrifuge overflow 514 had an oil content of 64%, a water content of 26%, and a specific gravity of 1.06. Thus, second centrifuge overflow fluid 514 may be obtained from feed fluid 502 by passing feed fluid 502 through separating system 500, and may have decreased specific gravity, increased percent volume of oil and water, decreased percent volume of high gravity solids, and decreased percent volume of low gravity solids.

Figure 5B:
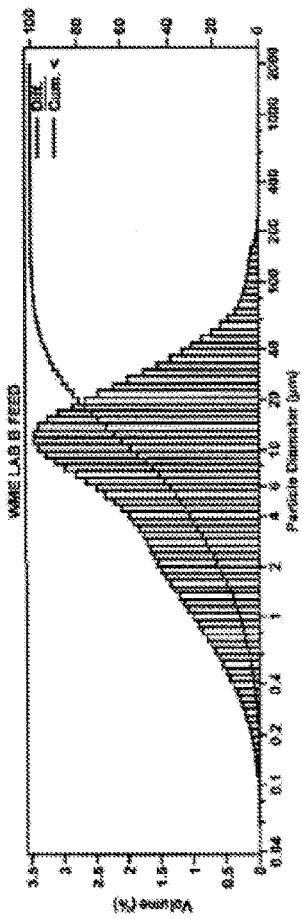
FIGS. 5B, 5C, and 5D depict test results of a separating system in accordance with embodiments disclosed herein.
Figure 5C:
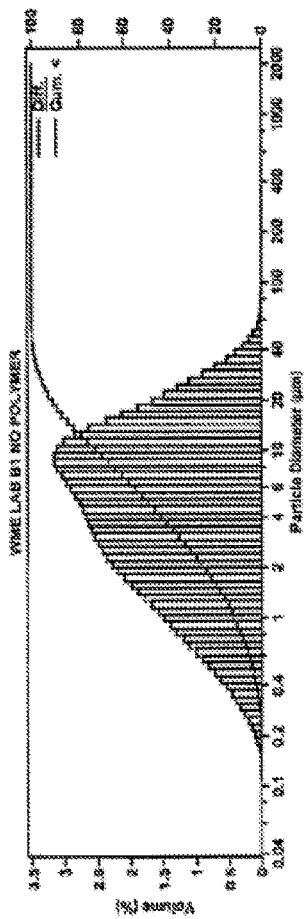

Referring now to FIGS. 5B and 5C, particle size distribution (PSD) graphs are shown for first centrifuge overflow 508, and second centrifuge overflow 514, respectively. According to FIG. 5B, the d50 particle size for first centrifuge overflow 508 was 8.187 micron. Referring to FIG. 5C, the d50 particle size for second centrifuge overflow 514 was 4.796 micron. Thus, second centrifuge 510 was able to remove a portion of the larger particles present in first centrifuge overflow 508, resulting in a decrease of the d50 particle size.

Figure 5D:
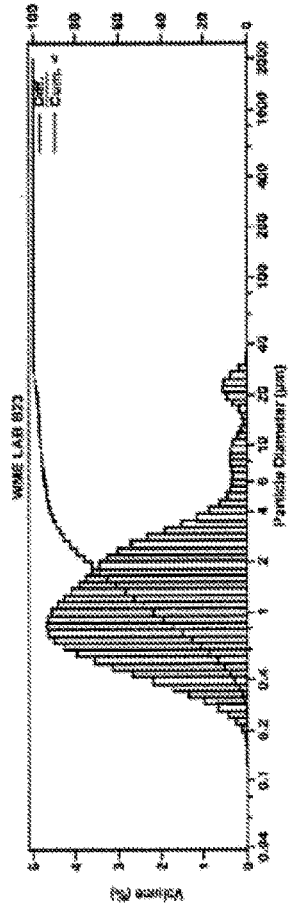

In some cases, chemicals may be added to feed fluid 502 or first centrifuge overflow 508 to further reduce the d50 of second centrifuge overflow 514. Chemicals that may be added include, for example, anionic surfactants, nonionic surfactants, alkyl polyglycosides, and combinations thereof. Referring to FIG. 5D, a PSD graph of a second centrifuge overflow fluid from a separating system using chemical additives is shown. The PSD graph shows that, in this example, a second centrifuge overflow from a separating system using chemical additives had a d50 of 1.082 micron.

Example 2: Centrifuge and Membrane Separator System

In a second test, the separation capability of a system including a centrifuge disposed in series with a membrane separator was analyzed. Referring back to FIG. 1A, a feed fluid 102 was introduced into a centrifuge 104. Centrifuge 104 had, in an embodiment, a 14" diameter, a 34" stainless steel bowl and conveyor assembly, and a 25 hp motor, but one of ordinary skill in the art will appreciate that other centrifuges may be used. After separation in centrifuge 104, a centrifuge underflow 106 was removed from separating system 100. A centrifuge overflow 108 then flowed from centrifuge 102 to membrane separator 110. In this test, a 0.1 micron membrane separator was used; however, any membrane separator in accordance with embodiments disclosed herein may be used. A permeate 112 filtered through membrane separator 110 while a concentrate 114 was removed from separating system 100. The properties and compositions of feed fluid 102, centrifuge underflow 106, centrifuge overflow 108, concentrate 114, and permeate 112 are provided in Table 2, below.

TABLE 2

Results of Filtration of Oil-Based Muds using a Centrifuge and a Membrane Separator

| | Feed Fluid | Centrifuge Overflow | Membrane Separator Concentrate | Membrane Separator Permeate | Virgin Base Oil |
|---|---|---|---|---|---|
| Specific gravity | 1.56 | 1.3 | 1.38 | 0.79 | 0.79 |
| Oil Content (% by vol) | 50.5 | 54 | 49.5 | 98.5 | 100 |
| Water Content (% by vol) | 24.5 | 27 | 31.5 | 0 | — |
| Solids Content (% by vol) | 25 | 19 | 19 | 1.5 | — |
| High Gravity Solids Content (% by vol) | 15.11 | 5.67 | Not measured | Not detected | — |
| Low Gravity Solids Content (% by vol) | 8.64 | 11.97 | Not measured | Not detected | — |
| Electrical Stability (V) | 263 | 283 | 230 | >1999 | — |
| Plastic Viscosity (cP) | 39 | 23 | Not measured | Not measured | — |
| Turbidity (NTU) | >100 | >100 | Not measured | 2.2 | — |

Table 2 shows that as feed fluid 102 passed through separating system 100, solids were removed from liquid and were concentrated in centrifuge underflow 106 and in concentrate 114. In this test, feed fluid 102 had an initial solids content of 25% with high gravity solids accounting for 15.11% and low gravity solids accounting for 8.64%. After passing through centrifuge 104, the solids content of centrifuge overflow 108 was 19% with high gravity solids making up 5.67% and low gravity solids making up 11.97%. The solids content of centrifuge underflow fluid 106 was 58% and centrifuge underflow 106 was removed from the system. Centrifuge overflow 108 then passed through membrane separator 110. After passing through membrane separator 110, the solids content of permeate 112 was measured at 1.5% and the solids content of concentrate 114 was 19%. The solids content of permeate 112 was an experimental error due to return analysis, as the result should have been less than 0.5 percent. The percent by volume of low gravity solids and the percent by volume of high gravity solids present in permeate 112 were too low to be measured and no water content was detected in permeate 112.

Electrical stability, plastic viscosity, and turbidity measurements were also taken at certain points during the test. Electrical stability of feed fluid 102 was 263 V. After passing through centrifuge 104, the electrical stability of centrifuge overflow 108 was approximately 283 V and, after passing through membrane separator 110, the electrical stability of membrane separator permeate 112 was greater than 1999 V. Plastic viscosity of feed fluid 102 was 39 centipoise and the plastic viscosity of centrifuge overflow 108 was 23 centipoise. Additionally, the turbidity measurement of membrane separator permeate 112 was 2.2 NTU. Thus, the measurements taken of feed fluid 102, centrifuge overflow 108, and membrane separator permeate 112, indicate that solids were removed from feed fluid 102 by centrifuge 104 and membrane separator 110.

Figure 1B:
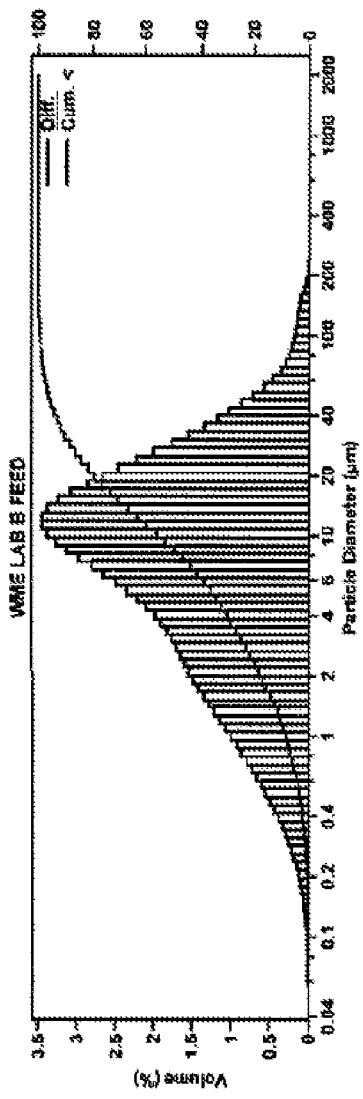
FIGS. 1B and 1C depict test results of a separating system in accordance with embodiments disclosed herein.
Figure 1C:
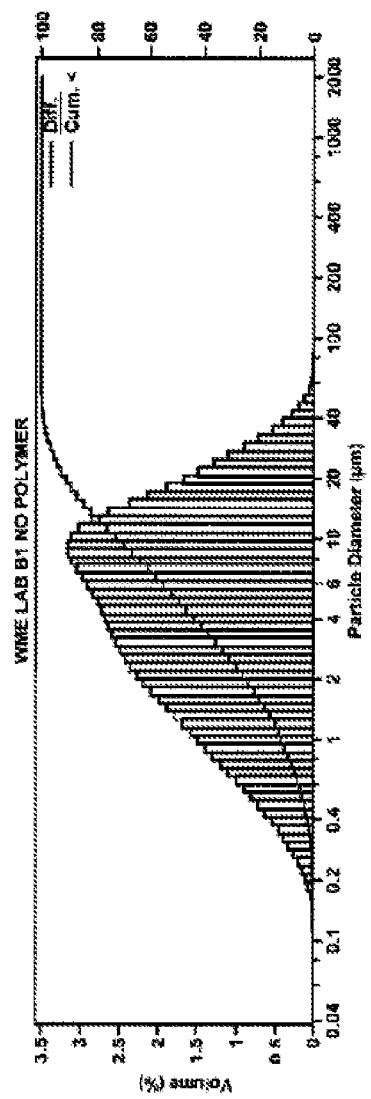

Additional information regarding the solids content of the fluids may be found in FIGS. 1B and 1C which show PSD graphs for centrifuge overflow 108 and concentrate 114, respectively. FIG. 1B shows that, in this test, the d50 particle size for centrifuge overflow 108 was 5.49 micron. The turbidity for centrifuge overflow 108 was 179.3 NTU. FIG. 1C shows that, in this test, the d50 particle size for concentrate 114 was 4.799 micron. A PSD graph for permeate 112 could not be generated because no visible particles were present in permeate 112. Thus, membrane separator permeate 112, obtained from feed fluid 102 by passing feed fluid 102 through separating system 100, may have decreased specific gravity, increased percent volume of oil and water, decreased percent volume of high gravity solids, and decreased percent volume of low gravity solids when compared with feed fluid 102.

Additionally, Table 3 below shows a comparison of membrane separator permeate 112 and second centrifuge overflow fluid 514, from Example 1.

TABLE 3

Second Centrifuge Overflow and Membrane Separator Permeate

| | Second Centrifuge Overflow | Membrane Separator Permeate |
|---|---|---|
| Specific Gravity | 1.06 | 0.79 |
| Oil Content (% by vol) | 64 | 98.5 |
| Water Content (% by vol) | 26 | 0 |
| Solids Content (% by vol) | 10 | 1.5 |
| High Gravity Solids Content (% by vol) | 4.09 | — |
| Low Gravity Solids Content (% by vol) | 4.24 | — |
| Electrical Stability (V) | — | >1999 |
| Plastic Viscosity (cP) | — | — |
| Turbidity (NTU) | — | 2.2 |

As shown in Table 3, the specific gravity of membrane separator permeate 112 is 0.79 which is lower than the specific gravity of second centrifuge overflow 514 which was 1.06. Additionally, the oil content of membrane separator permeate 112 is higher than that of second centrifuge overflow 514. Specifically, the oil content of membrane separator permeate 112 was approximately 64% while the oil content of membrane separator permeate 112 was around 98.5%. Further, the solid content of second centrifuge overflow 514 was approximately 10%, with 4.09% being high gravity solids and 4.24% being low gravity solids. Membrane separator permeate 112 had a solid content of around 1.5%. As discussed above, permeate 112 solids content of 1.5% is an experimental error, as the results should have been less than 0.5%. Thus, the percent of solid content of membrane separator permeate 112 was less than the percent of solid content of second centrifuge overflow fluid 514.

Example 3: Membrane Separator Filtration of a Used Drilling Fluid

Figure 6:
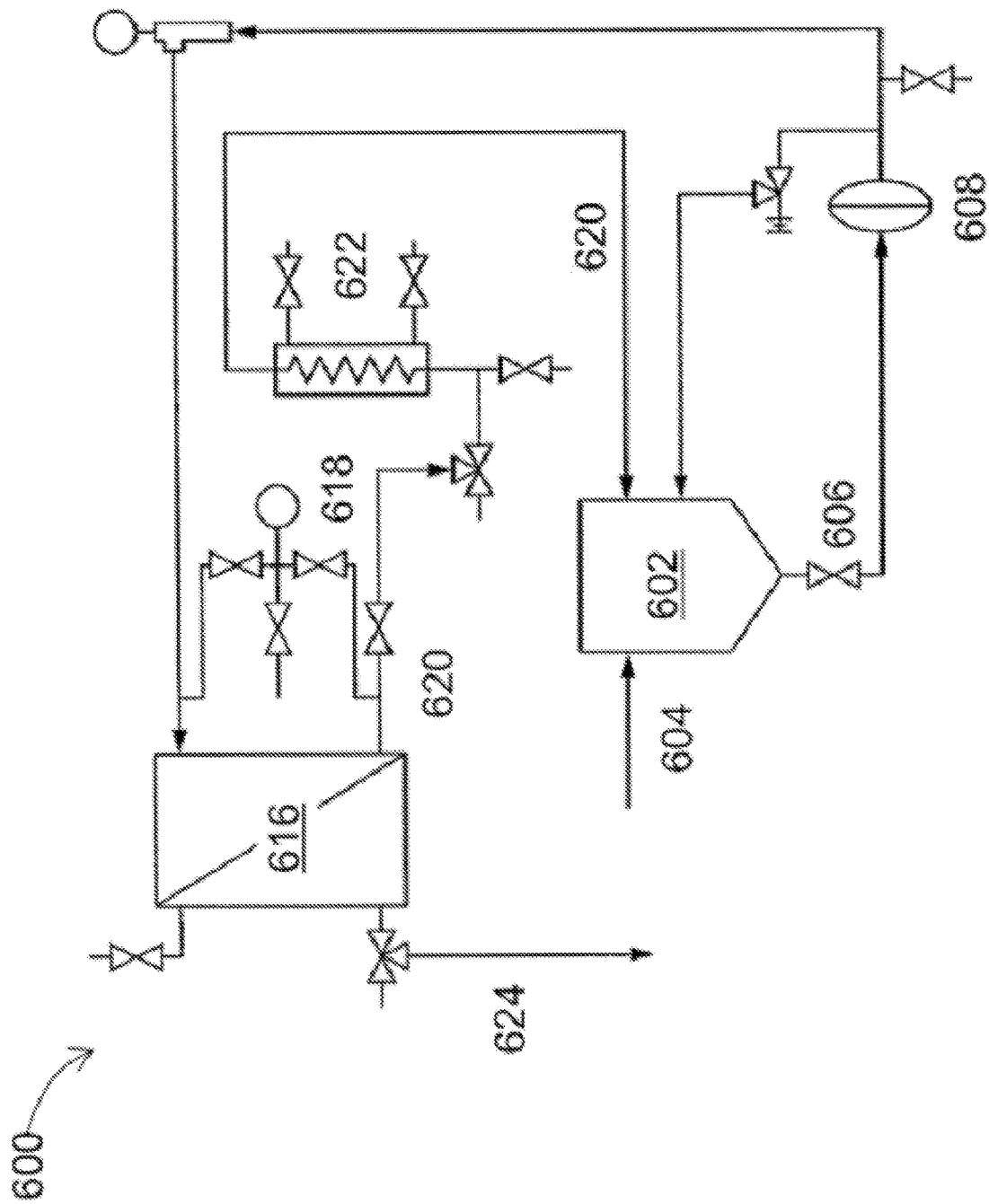
FIG. 6 is a schematic view of a separating system in accordance with embodiments disclosed herein.

In this test, solid-laden fluid 604 included a synthetic IO 1618-based drilling fluid, specifically, Rheliant® System drilling fluid. Referring to FIG. 6, solid-laden fluid 604 was introduced to a feed tank 602 in separating system 600. From feed tank 602, solid-laden fluid 604 passed through valve 606 to feed pump 608. In this test, membrane module 616 included six membrane separators (not independently illustrated) connected in series with welded u-bends and enclosed by a permeate collection shell. Additionally, the membrane separators were made of sintered 316L stainless steel having a coating of sintered titanium dioxide and a pore size of 0.1 micron. The total membrane separator area for this test was 0.754 square feet.

As shown in separating system 600, a pressure gauge 618 measured the pressure of solid-laden fluid 604 entering membrane module 616 and measured the pressure of concentrate 620 exiting membrane module 616. Concentrate 620 then flowed past a series of valves, through heat exchanger 622, and back into feed tank 602. In this test, cooling water was passed through heat exchanger 622 to decrease the temperature of concentrate 620 rather than to increase it. However, due to pump work, the temperature of concentrate 620 still increased slightly despite the cooling effect of heat exchanger 622. In this test, manual agitation occurs in feed tank 602 due to the high viscosity of solid-laden fluid 604, and the test was terminated after collecting a sample of permeate 624.

Example 4: Addition of Demulsifiers to Membrane Separator Feed Fluid

Figure 8:
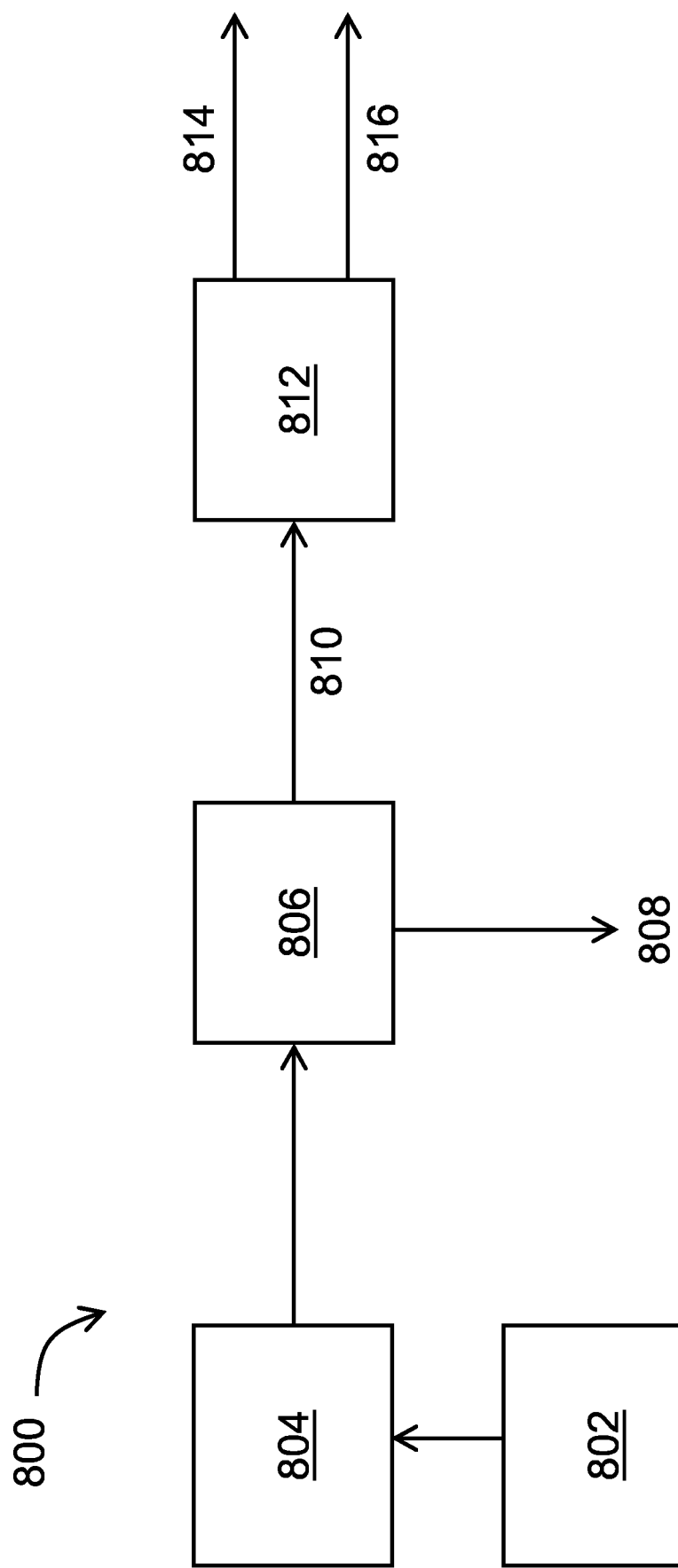
FIG. 8 is a schematic view of a separating system in accordance with embodiments disclosed herein.

Referring to FIG. 8, a separating system 800 is shown having demulsifiers 802 that may be added to feed fluid 804 before feed fluid 804 enters membrane separator 806. Membrane separator 806 may divide the feed fluid and demulsifier mixture into a concentrate 808 and a permeate 810. Permeate 810 may pass through an oil/water separator 812 which separates permeate 810 into oil 814 and water 816.

To simulate the effects of demulsifiers on a system similar to separating system 800 during experimentation, demulsifiers were added to mud samples at varying temperatures. The mixtures were stirred, transferred to 50 mL centrifuge tubes, and transferred to a centrifuge for ten minutes. Properties of a feed fluid sample prior to the addition of demulsifiers are included in Table 4 below.

TABLE 4

Properties of Centrifuge Effluent Prior to Addition of Demulsifiers

| Temperature | Oil (% by vol) | Oil (mL) | Water (% by vol) | Water (mL) | Solids (% by vol) | Solids (mL) |
|---|---|---|---|---|---|---|
| 950° F. | 62.5 | 31.25 | 29 | 14.5 | 8.5 | 4.25 |

In this test, two demulsifiers, EMR-961 and EMR-953, were used at concentrations of 1% by volume and 2% by volume. The demulsifiers were added to a mud sample and the mixture was stirred. The mixture was then transferred to a 50 mL centrifuge tube and was subjected to centrifugation for approximately ten minutes. The tests were conducted at 68 degrees Fahrenheit and at 160 degrees Fahrenheit. The resulting phases were recorded by performing a retort analysis at 950 degrees Fahrenheit and the results of the retort analysis can be found in Tables 5 and 6 below.

TABLE 5

Filtration using Demulsifiers added to Centrifuge Effluent at 68° F.

| Demulsifier | Concentration (% by vol) | Electrical Stability (Volts) | Sample Volume (Liquid sample + Demulsifier) (mL) | Oil (mL) | Emulsion (mL) | Water (mL) | Solids (mL) | Water Separated (%) |
|---|---|---|---|---|---|---|---|---|
| EMR-961 | 1% | 134.33 | 50 | 5 | 30 | 12 | 3 | 83 |
| EMR-961 | 2% | 96.33 | 50 | 9 | 28 | 10 | 3 | 69 |
| EMR-953 | 1% | 119.00 | 50 | 7 | 30.5 | 9.5 | 3 | 66 |
| EMR-953 | 2% | 121.33 | 50 | 9 | 26 | 12 | 3 | 83 |

TABLE 6

Filtration using Demulsifiers added to Centrifuge Effluent at 160° F.

| Demulsifier | Concentration (% by vol) | Electrical Stability (Volts) | Sample Volume (Liquid sample + Demulsifier) (mL) | Oil (mL) | Emulsion (mL) | Water (mL) | Solids (mL) | Water Separated (%) |
|---|---|---|---|---|---|---|---|---|
| EMR-961 | 1% | 421.33 | 50 | 9 | 28 | 9 | 4 | 62 |
| EMR-961 | 2% | 215 | 47.5 | 10 | 25 | 8.5 | 4 | 62 |
| EMR-953 | 1% | 99.33 | 47.5 | 7.5 | 30 | 7 | 3 | 51 |
| EMR-953 | 2% | 177 | 47.5 | 7.5 | 26 | 10 | 4 | 73 |

The test results in Tables 5 and 6 show that when added to centrifuge effluent, EMR-961 at 1% by volume gave 83% water recovery at 68° F. and 62% water recovery at 160° F. At 2% by volume, EMR-961 gave 69% water recovery at 68° F. and 62% water recovery at 160° F. Demulsifier EMR-953 at 1% by volume gave 66% water recovery at 68° F. and 51% water recovery at 160° F. EMR-953 at 2% by volume gave 83% water recovery at 68° F. and 73% water recovery at 160° F. Thus, the addition of demulsifiers to a slurry may break emulsions within the slurry, thereby assisting in separating water content from the slurry.

Example 5: Addition of Demulsifiers to a First Membrane Concentrate

Figure 9:
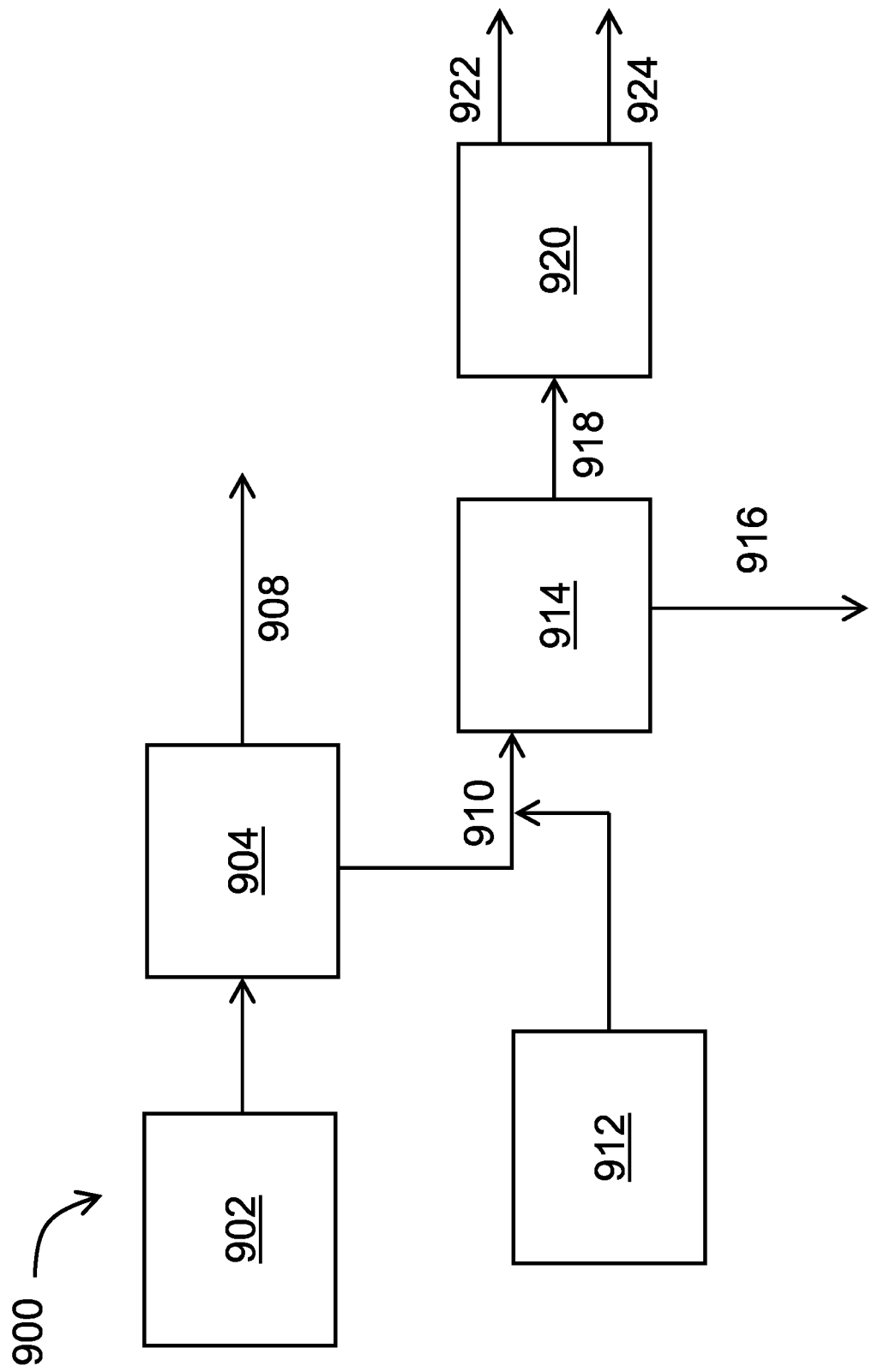
FIG. 9 is a schematic view of a separating system in accordance with embodiments disclosed herein.
Figure 10:
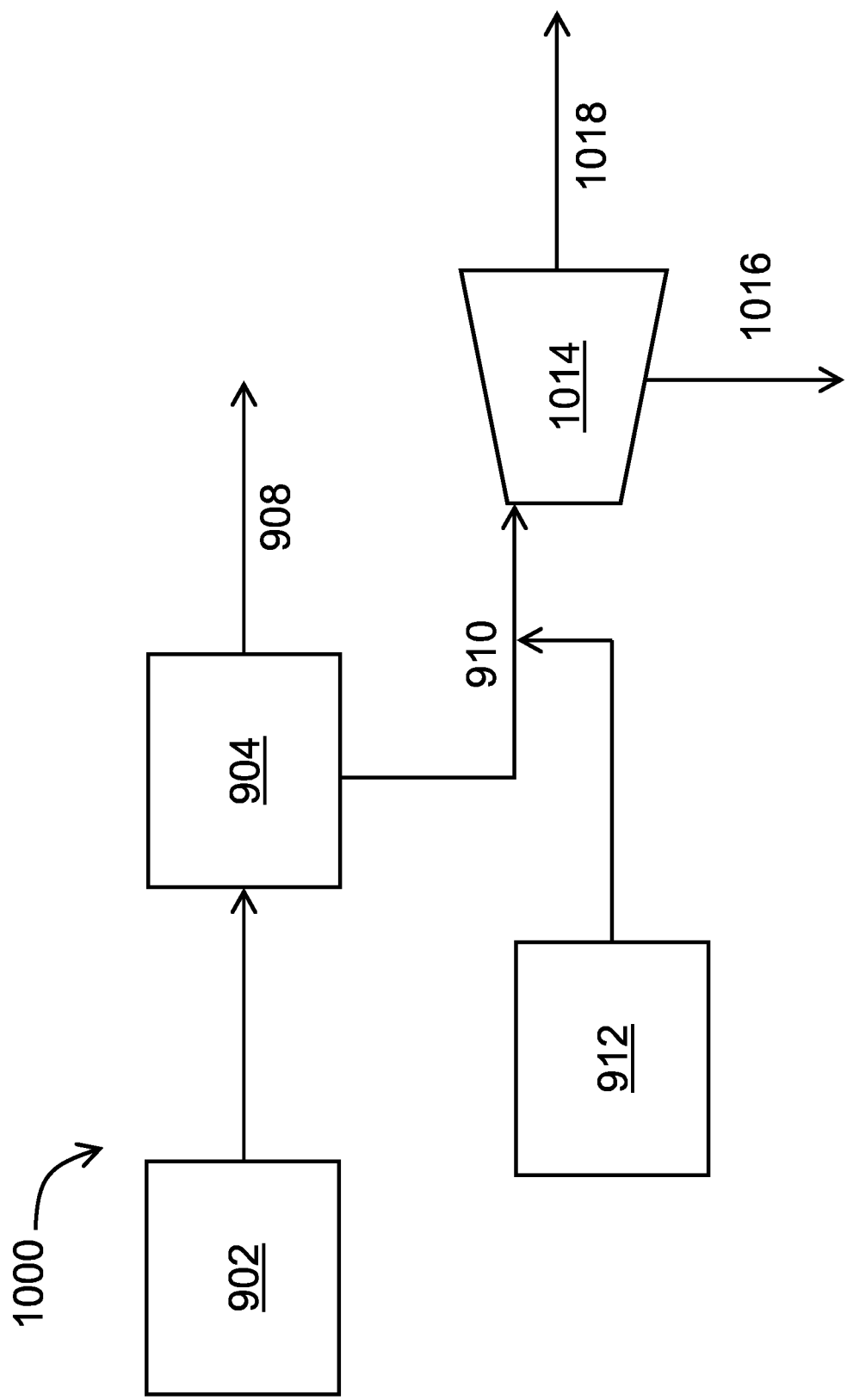
FIG. 10 is a schematic view of a separating system in accordance with embodiments disclosed herein.

Referring to FIGS. 9 and 10, separating systems 900 and 1000 are shown having a feed fluid 902 in fluid communication with a first membrane separator 904. First membrane separator 904 divides feed fluid 902 into first permeate 908 and first concentrate 910. In separating system 900, demulsifiers 912 are added to first concentrate 910 and the mixture is directed to a second membrane separator 914. Second membrane separator 914 divides the mixture of demulsifiers 912 and first concentrate 910 into a second concentrate 916 having a high solids content and a second permeate 918 having a high water content. Second permeate 918 is fed to an oil/water separator 920 where it is separated into oil 922 and water 924. Referring specifically to FIG. 10, in separating system 1000, demulsifiers 912 are added to first concentrate 910 and the mixture is directed to a centrifuge 1014. Centrifuge 1014 separates the mixture of demulsifiers 912 and first concentrate 910 into an under flow 1016 having a high solids content, and an overflow 1018 having oil, water, and a low solids content.

To simulate the effects of demulsifiers on a system similar to separating system 900, demulsifiers were added to mud samples at varying temperatures. Properties of a concentrate sample prior to the addition of demulsifiers are included in Table 7 below. The mixtures were stirred, transferred to 50 mL centrifuge tubes, and transferred to a centrifuge for ten minutes.

TABLE 7

| | Properties of Membrane Concentrate Prior to Addition of Demulsifiers | | | | | |
|---|---|---|---|---|---|---|
| Temperature | Oil (% by vol) | Oil (mL) | Water (% by vol) | Water (mL) | Solids (% by vol) | Solids (mL) |
| 950° F. | 39.5 | 19.75 | 49.5 | 24.8 | 11 | 5.45 |

In this test, two demulsifiers, EMR-961 and EMR-953, were used at concentrations of 1% by volume and 2% by volume. Each of the tests was conducted at 68 degrees Fahrenheit and at 160 degrees Fahrenheit. The resulting phases were recorded and can be found in Tables 8 and 9 below.

TABLE 8

| | Filtration using Demulsifiers added to Membrane Separator Effluent at 68° F. | | | | | | |
|---|---|---|---|---|---|---|---|
| Demulsifier | Electrical Stability (Volts) | Sample Volume (Liquid sample + Demulsifier) (mL) | Oil (mL) | Emulsion (mL) | Water (mL) | Solids (mL) | Water Separated (%) |
| EMR-961 | 3.67 | 50 | 0 | 24.5 | 21.5 | 4 | 87 |
| EMR-961 | 2.33 | 50 | 0 | 22.5 | 23.5 | 4 | 95 |
| EMR-953 | 7.33 | 50 | 0 | 50 | 0 | 0 | 0 |
| EMR-953 | 3.33 | 50 | 0 | 25 | 20 | 5 | 81 |

TABLE 9

| | Filtration using Demulsifiers added to Membrane Separator Effluent at 160° F. | | | | | | |
|---|---|---|---|---|---|---|---|
| Demulsifier | Electrical Stability (Volts) | Sample Volume (Liquid sample + Demulsifier) (mL) | Oil (mL) | Emulsion (mL) | Water (mL) | Solids (mL) | Water Separated (%) |
| EMR-961 | 68 | 39 | 0 | 16.5 | 18.5 | 4 | 96 |
| EMR-961 | 18.67 | 40 | 0 | 17.5 | 18.5 | 4 | 93 |
| EMR-953 | 56.67 | 42.5 | 0 | 35 | 3.5 | 4 | 17 |
| EMR-953 | 3.67 | 40 | 0 | 20 | 15 | 5 | 76 |

The test results in Tables 8 and 9 show that, when added to a membrane separator concentrate, EMR-961 at 1% by volume gave 87% water recovery at 68° F. and 96% water recovery at 160° F. At 2% by volume, EMR-961 gave 95% water recovery at 68° F. and 93% water recovery at 160° F. Demulsifier EMR-953 at 1% by volume gave 0% water recovery at 68° F. and 17% water recovery at 160° F. EMR-953 at 2% by volume gave 81% water recovery at 68° F. and 76% water recovery at 160° F.

Example 6: Addition of Dispersant to a Synthetic Based Mud

Figure 11:
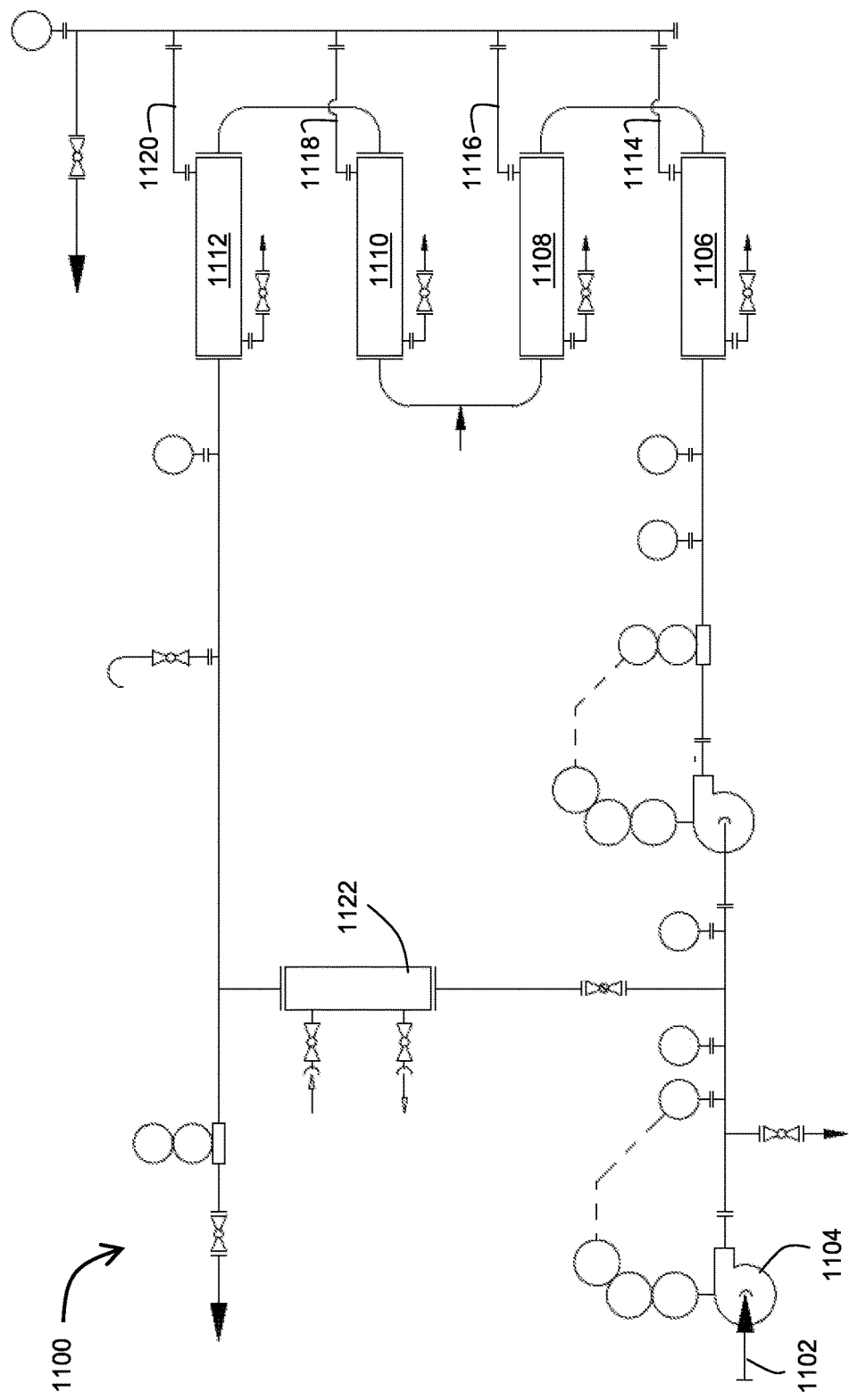
FIG. 11 is a schematic view of a separating system in accordance with embodiments disclosed herein.

Referring to FIG. 11, a separating system 1100 is shown. Separating system 1100 may include a fluid inlet 1102 configured to receive a feed fluid, and a pump 1104 configured to pump the feed fluid to a series of membrane separators 1106, 1108, 1110, 1112. A permeate may be collected from membrane separators 1106, 1108, 1110, 1112 at exits 1114, 1116, 1118, 1120, respectively. A concentrate may be pumped through each of membrane separators 1106, 1108, 1110, 1112, and may then be mixed into the feed fluid, thereby recirculating the concentrate through separating system 1100. In certain embodiments, a heat exchanger 1122 may be used to increase or decrease the temperature of the concentrate and/or the feed fluid.

Figure 12:
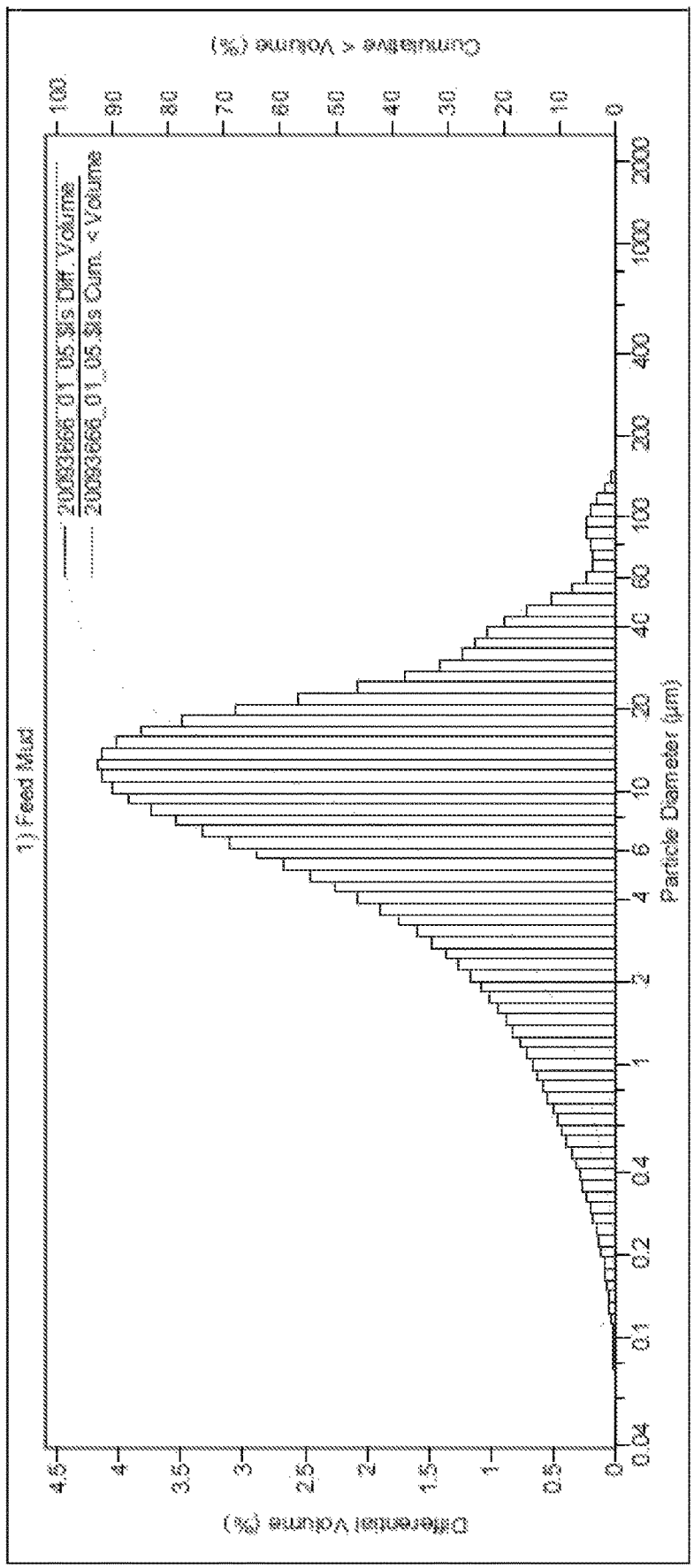
FIG. 12 is a particle size distribution of a feed fluid in accordance with embodiments disclosed herein.

In this test, separating system 1100 included membrane separators 1106, 1108, 1110, 1112 selected to provide a total membrane separator area of 15 square feet. Additionally, Rheliant System® drilling fluid including 2 pounds per barrel ("ppb") of Rheduce® dispersant was selected as the feed fluid. A PSD of the feed fluid is shown in FIG. 12. Properties of the feed fluid, permeate, and concentrate are shown below in Table 10.

TABLE 10

Properties of Rheliant System ® with Rheduce ® Feed Fluid, Permeate, and Concentrate

|  | Density (ppg) | Oil (% by wt.) | Water (% by wt.) | Solids (% by wt.) | Chloride content (mg/l) | Electron Stability |
|---|---|---|---|---|---|---|
| Feed Fluid | 8.68 | 50.13 | 26.61 | 23.26 | 35000 | — |
| Permeate | 6.61 | — | — | — | — | >1999 |
| Concentrate | 10.83 | 39.14 | 13.68 | 47.18 | 87000 | — |

The feed fluid having a density of 8.68 ppg was circulated through system 1100 for approximately 4.25 hours. The feed fluid was separated by separating system 1100 into a permeate having a decreased density of 6.61 ppg and a concentrate having an increased density of 10.83 ppg. As can be seen from Table 10, the separating system 1100 separated the chloride content into the concentrate and increased the density of the chloride content. Approximately 65% by weight of the oil contained within the feed fluid was collected. Because no visual particles were present in the permeate, a PSD could not be performed.

Example 7: Membrane Separator Filtration of Versapro® Drilling Fluid

In this test, separating system 1100 was used to separate a sample of Versapro® drilling fluid, commercially available from Hagemeyer North America, Inc. of Charleston, S.C. Initial feed fluid properties in addition to collected permeate and concentrate properties can be found below in Table 11.

TABLE 11

Properties of Versapro ® Feed Fluid, Permeate, and Concentrate

|  | Density (ppg) | Oil (% by wt.) | Water (% by wt.) | Solids (% by wt.) | Chloride content (mg/l) | Electron Stability |
|---|---|---|---|---|---|---|
| Feed Fluid | 8.7 | 57.75 | 18.02 | 24.27 | 38500 | — |
| Permeate | 6.87 | — | — | — | — | >1999 |
| Concentrate | 10.66 | 43.95 | 8.03 | 48.02 | 94000 | — |

The feed fluid having a density of 8.7 ppg was circulated through system 1100 for approximately five hours. The feed fluid was separated by separating system 1100 into a permeate having a density of 6.87 ppg and a concentrate having a density of 10.66 ppg. As can be seen from Table 11, the separating system 1100 separated the chloride content of the feed fluid into the concentrate, and increased the concentration of the chloride content. Approximately 65% by weight of the oil contained within the feed fluid was collected. Because no visual particles were present in the permeate, a PSD could not be performed.

Figure 13:
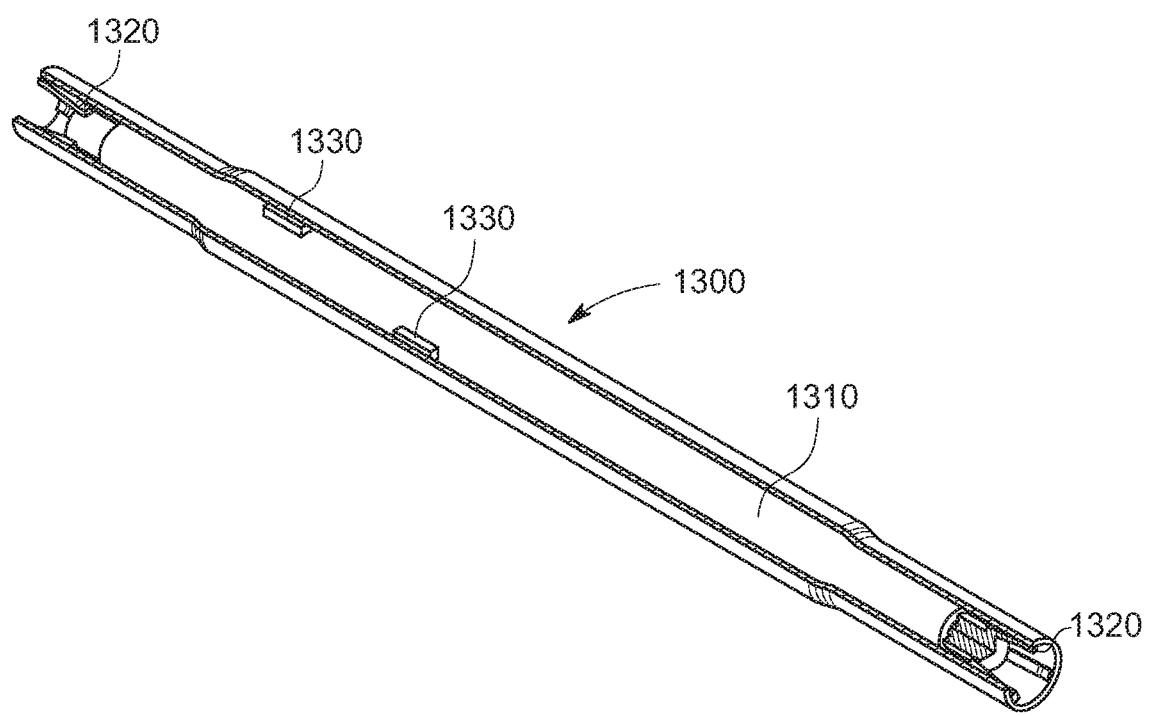
FIG. 13 is a plan view of a separating system with insert in accordance with embodiments disclosed herein.

Referring to FIG. 13, a separating system 1300 is shown in accordance with embodiments disclosed herein. The separating system 1300 may be referred to as a transverse flow microfiltration membrane separator or a membrane separator. Velocity of a fluid may be maintained by controlling the flow rate (of the solids laden fluid) circulating through the membranes. Microfiltration of the fluid occurs at the surface of the membrane.

In some embodiments, the separating system 1300 may have an insert 1310 disposed within. The insert 1310 may be placed through the middle of the separating system 1300 such that the distance between the outer surface of the insert 1310 and the inner surface of the separating system 1300 are equidistant at all points. At least one support 1330 is coupled to the insert and the separating system 1300. In an embodiment, the at least one support 1330 may be in a helical arrangement on the exterior side of the separating system 1300. Such helical arrangement may provide support along the sides of the insert 1310.

Generally, the insert 1310 may reduce the cross sectional area of separating system 1300, thereby decreasing the flow occurring to maintain a given transverse flow velocity. Inserts 1310 may be formed of any suitable rigid material, such as Teflon®, for example, such that the insert 1310 does not react with the fluid flowing within the separating system 1300.

The reduced flow provided by the insert 1310 may permit an increased number of parallel membrane separators for a given arrangement of capital equipment, i.e., pumps, instruments, valves, heat exchangers, etc. Thus, there may be an increase in the quantity of solids laden fluid filtered and the quantity of permeate produced. Further, power provided to maintain fluid velocity gradients at the surface of the separating system 1300 may be reduced as fluid power within a reduced cross sectional area is more efficiently employed to develop a given shear stress against the side of the separating system 1300.

The separating system 1300 may further comprise an insert holder 1320 for coupling the insert 1310 to an end of the separating system 1300. The insert holder 1320 may employ any reasonable fastening means, such as by a clip, for example, to couple the insert 1310 to the separating system 1300.

A limited number of embodiments of the present disclosure have been discussed herein. Those having ordinary skill in the art will appreciate that a variety of separating systems may be designed that are within the scope of the present disclosure. Depending on a variety of factors such as, for example, slurry composition, space constraints, environmental restrictions, etc., it may be advantageous to adapt a certain separating system disclosed herein to comply with design requirements. For example, it may be advantageous to include one or more recycle loops, wherein each recycle loop directs fluid from a desired point in the system to a preceding point in the system. It may also be advantageous to include at least one heat exchanger, wherein the heat exchanger increases or decreases the temperature of a fluid in the system. Further it may be advantageous to inject at least one chemical additive into a slurry in at least one point in the system. By altering separating systems disclosed herein, unique separating systems may be designed to meet specific performance and design requirements.

A separating system in accordance with embodiments disclosed herein may advantageously have a small footprint that may be accommodated on an off-shore drilling rig platform. Additionally, embodiments disclosed herein may provide a robust mechanical separating system that may be used continuously during drilling and other wellbore treatment operations. Furthermore, a variety of solid-laden fluids may be treated using the mechanical process disclosed above regardless of the formulation or composition thereof.

Separating systems in accordance with embodiments disclosed herein may also reduce or eliminate costs associated with building new fluids and treating spent fluids using chemical additives. Eliminating the need for chemical additives may increase the predictability of success of the separating system by eliminating the variability associated with chemical-based processes. Further, eliminating the use of chemical additives and the building of new fluids may improve health, safety, and environmental conditions. Additionally, the risk of carryover of treatment chemicals which may be detrimental for final product usage such as, for example, polymers and surfactants, may be eliminated.

Permeate collected from a separating system in accordance with embodiments disclosed herein may contain few or no solids. Specifically, as discussed above in examples 1 and 2, a separating system having multiple centrifuges may produce a fluid having 10% solids content while a separating system including a membrane separator, in accordance with embodiments disclosed herein, may produce a permeate having approximately 0.5% solids content. Thus, a separating system including a membrane separator may reduce the amount of solids present in a filtered fluid. Additionally, in select embodiments, the present disclosure may provide a separating system that may be used to continuously accept solid-laden fluids from a wellbore, separate solids from fluids, and return fluids to the wellbore.

In addition to treating drilling fluids, other types of fluids may also be treated according to embodiments of the present disclosure. Completion, workover, production, and waste/oil-based sludges may also be treated. Advantageously, embodiments of the present disclosure may provide for systems and methods that remove the need for diatomaceous earth filtration and/or downstream guard cartridges. As diatomaceous earth filters may inadvertently result in bleed through that may cause irreversible formation damage, the removal of such filters from a processing system may advantageously prevent formation damage. Additionally, membrane filtration may advantageously provide systems that require less labor to operate, as well as result in less material handling by operators. Furthermore, prior filtration systems were generally limited to providing filtration up for particular matter greater than 2 microns. The present disclosure may advantageously provide for filtration as low as 0.1 micron.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed:
1. A system for processing fluids, the system comprising:
   a pump in fluid communication with a used fluid pit;
   a membrane separator in fluid communication with the used fluid pit, the membrane separator comprising
      a first end defining a first opening;
      a second end defining a second opening, the second end axially opposing the first end; and
      an inner surface extending from the first opening to the second opening;
   a solid cylindrical insert disposed within the membrane separator, the solid cylindrical insert comprising
      a first end;
      a second end axially opposing the first end;
      a total length defined between the first end of the solid cylindrical insert and the opposite second end of the solid cylindrical insert;
      an outer surface extending the total length of the solid cylindrical insert, the outer surface of the solid cylindrical insert and the inner surface of the mem- brane separator defining a flow passage extending from the first opening to the second opening, wherein a first insert holder couples the first end of the solid cylindrical insert to the first end of the membrane separator and a second insert holder couples the second end of the solid cylindrical insert to the opposite second end of the membrane separator, wherein the solid cylindrical insert is configured to prohibit fluid flow through the solid cylindrical insert and to direct fluid flow through the flow passage, thereby decreasing fluid flow through the membrane separator; and a clean fluid pit in fluid communication with the membrane separator.

2. The system of claim 1, further comprising at least one support coupled to the solid cylindrical insert between the first end and the second end of the solid cylindrical insert, the at least one support disposed between the solid cylindrical insert and the membrane separator.

3. The system of claim 1, further comprising a primary separator in fluid communication with the used fluid pit and the membrane separator.

4. The system of claim 3, wherein the primary separator comprises at least one of a shaker, a centrifuge, and a hydrocyclone.

5. The system of claim 1, wherein the membrane separator is configured to separate a fluid into a permeate and a concentrate.

6. The system of claim 5, further comprising:
a recirculation loop configured to return the concentrate to the membrane separator.

7. The system of claim 1, wherein the membrane separator comprises at least one multiple channel membrane.

8. A system for processing fluids, the system comprising:
a pump in fluid communication with a used fluid pit;
a transverse flow microfiltration membrane separator in fluid communication with the used fluid pit, comprising at least one membrane configured for microfiltration of a fluid at a surface of the at least one membrane, and having a solid cylindrical insert placed through a middle of the transverse flow microfiltration membrane separator, wherein the solid cylindrical insert is configured to prohibit fluid flow through the solid cylindrical insert, thereby decreasing fluid flow through the transverse flow microfiltration membrane separator; and
a clean fluid pit in fluid communication with the transverse flow microfiltration membrane separator.

9. A system for processing fluids, the system comprising:
a pump in fluid communication with a used fluid pit;
a membrane separator in fluid communication with the used fluid pit, wherein a solid cylindrical insert is disposed within the membrane separator and placed through a middle of the membrane separator such that distances between an outer surface of the solid cylindrical insert and an inner surface of the membrane separator are equidistant at all points, wherein the solid cylindrical insert is configured to prohibit fluid flow through the solid cylindrical insert, thereby decreasing fluid flow through the membrane separator; and
a clean fluid pit in fluid communication with the membrane separator.

* * * * *